(12) United States Patent
Kadota

(10) Patent No.: US 10,875,416 B2
(45) Date of Patent: Dec. 29, 2020

(54) MOBILE OBJECT APPARATUS, NON-CONTACT POWER FEED SYSTEM, AND METHOD OF DRIVING MOBILE OBJECT APPARATUS

(71) Applicant: SONY CORPORATION, Tokyo (JP)

(72) Inventor: Seiji Kadota, Kanagawa (JP)

(73) Assignee: SONY CORPORATION, Tokyo (JP)

(*) Notice: Subject to any disclaimer, the term of this patent is extended or adjusted under 35 U.S.C. 154(b) by 257 days.

(21) Appl. No.: 15/745,870

(22) PCT Filed: May 23, 2016

(86) PCT No.: PCT/JP2016/002492
§ 371 (c)(1),
(2) Date: Jan. 18, 2018

(87) PCT Pub. No.: WO2017/022154
PCT Pub. Date: Feb. 9, 2017

(65) Prior Publication Data
US 2018/0207520 A1    Jul. 26, 2018

(30) Foreign Application Priority Data
Aug. 6, 2015 (JP) .................. 2015-156011

(51) Int. Cl.
*H01F 27/42* (2006.01)
*H01F 37/00* (2006.01)
(Continued)

(52) U.S. Cl.
CPC .............. *B60L 53/39* (2019.02); *A63H 29/22* (2013.01); *H02J 50/12* (2016.02); *H02J 50/40* (2016.02);
(Continued)

(58) Field of Classification Search
CPC .. H02J 50/90; H02J 50/80; H02J 50/12; H02J 50/40; B60L 53/39; A63H 3/36;
(Continued)

(56) References Cited

U.S. PATENT DOCUMENTS

| | | | | |
|---|---|---|---|---|
| 2007/0069021 A1* | 3/2007 | Elrod | ..................... | G06K 17/00 235/451 |
| 2009/0230777 A1* | 9/2009 | Baarman | .................. | H01F 38/14 307/104 |
| 2010/0130096 A1* | 5/2010 | Baarman | ................ | A63H 18/12 446/444 |
| 2012/0038223 A1* | 2/2012 | Harakawa | ............... | H02J 5/005 307/109 |

(Continued)

FOREIGN PATENT DOCUMENTS

| JP | 2006-087214 A | 3/2006 | | |
|---|---|---|---|---|
| JP | 2006087214 A | * 3/2006 | ............. | H04L 1/188 |

(Continued)

OTHER PUBLICATIONS

International Search Report and Written Opinion of PCT Application No. PCT/JP2016/002492, dated Jul. 26, 2016, 07 pages.

*Primary Examiner* — Rexford N Barnie
*Assistant Examiner* — Rasem Mourad
(74) *Attorney, Agent, or Firm* — Chip Law Group

(57) ABSTRACT

A mobile object apparatus includes an electric power reception unit that receives electric power transmitted in a non-contact manner from, out of a plurality of power feed apparatuses that are allocated to a plurality of small areas within a predetermined area and are capable of transmitting electric power in a non-contact manner, the power feed apparatus allocated to the small area adjacent to the mobile object apparatus, a drive unit that executes a movement operation on the predetermined area, and an electric power storage unit that stores an electric power amount requisite for the movement operation to the small areas within a predetermined range from the adjacent small area.

10 Claims, 30 Drawing Sheets

(51) Int. Cl.
  *H01F 38/00* (2006.01)
  *B60L 53/39* (2019.01)
  *H02J 50/90* (2016.01)
  *H02J 50/80* (2016.01)
  *H02J 50/12* (2016.01)
  *H02J 50/40* (2016.01)
  *A63H 29/22* (2006.01)
(52) U.S. Cl.
  CPC .............. *H02J 50/80* (2016.02); *H02J 50/90*
  (2016.02); *Y02T 10/70* (2013.01)
(58) Field of Classification Search
  CPC ................ A63H 29/22; Y02T 10/7005; A63F
  2009/2492; A63F 2009/2482; A63F
  2009/2494; A63F 2250/52; B60M 7/006;
  G05D 1/02; G05D 2201/0217
  See application file for complete search history.

(56) References Cited

U.S. PATENT DOCUMENTS

| 2014/0138199 | A1* | 5/2014 | Ichikawa | B60L 53/30 |
| | | | | 191/10 |
| 2015/0364926 | A1* | 12/2015 | Nagamine | H02J 50/80 |
| | | | | 307/104 |
| 2016/0046192 | A1* | 2/2016 | Takatsu | B60L 53/126 |
| | | | | 191/10 |

FOREIGN PATENT DOCUMENTS

| JP | 2010-213554 | A | | 9/2010 | |
| JP | 2011244532 | A | * | 12/2011 | ............. H02J 7/025 |
| JP | 2012-075302 | A | | 4/2012 | |
| WO | 2010/103787 | A1 | | 9/2010 | |

* cited by examiner

MOBILE OBJECT APPARATUS, NON-CONTACT POWER FEED SYSTEM, AND METHOD OF DRIVING MOBILE OBJECT APPARATUS

CROSS REFERENCE TO RELATED APPLICATIONS

This application is a U.S. National Phase of International Patent Application No. PCT/JP2016/002492 filed on May 23, 2016, which claims priority benefit of Japanese Patent Application No. JP 2015-156011 filed in the Japan Patent Office on Aug. 6, 2015. Each of the above-referenced applications is hereby incorporated herein by reference in its entirety.

TECHNICAL FIELD

The present technology relates to a mobile object apparatus that performs operations of movements and the like using electric power transmitted in a non-contact manner, non-contact power feed system that supplies electric power to this mobile object apparatus, and a method of driving the mobile object apparatus.

BACKGROUND ART

In a non-contact power feed system that uses an electromagnetic resonance phenomenon, there are advantages that, from a principle called the electromagnetic resonance phenomenon, electric power can be transmitted while setting a larger distance than in an electromagnetic induction system and transmission efficiency does not fall that much even if an axial alignment is somewhat poor. It should be noted that there are a magnetic field resonance type and an electric field resonance type as the electromagnetic resonance phenomenon. There is known a non-contact power feed system that uses this magnetic field resonance-type non-contact power feed system to supply electric power to various electronic apparatuses at a specific location in a non-contact manner so as to enable the electric power to be used as operation power of the electronic apparatuses.

As this type of non-contact power feed system, there is known a technology that permits, only to an electronic apparatus that has succeeded in an authentication, control that uses electric power supplied to electronic apparatuses from a power feed-side apparatus, from a viewpoint of anti-theft of an electronic apparatus and the like (see, for example, Patent Literature 1).

CITATION LIST

Patent Literature

Patent Literature 1: Japanese Patent Application Laid-open No. 2012-75302

DISCLOSURE OF INVENTION

Technical Problem

Various improvements such as an additional improvement of convenience and multiple functionalization are expected for this type of non-contact power feed system.

In this regard, the present technology aims at providing a mobile object apparatus, a non-contact power feed system, and a method of driving the mobile object apparatus, with which those objects can be attained.

Solution to Problem

For attaining the objects described above, a mobile object apparatus according to an embodiment of the present technology includes:

an electric power reception unit that receives electric power transmitted in a non-contact manner from, out of a plurality of power feed apparatuses that are allocated to a plurality of small areas within a predetermined area and are capable of transmitting electric power in a non-contact manner, the power feed apparatus allocated to the small area adjacent to the mobile object apparatus;

a drive unit that executes a movement operation on the predetermined area; and an electric power storage unit that stores an electric power amount requisite for the movement operation to the small areas within a predetermined range from the adjacent small area.

The electric power storage unit may be configured to store an electric power amount with which the operation can be executed once at most.

The mobile object apparatus may further include a first control unit that calculates an electric power amount stored in the electric power storage unit at the time electric power is received and performs, when the calculated electric power amount reaches a threshold value requisite for the drive unit to execute the operation, control such that electric power stored in the electric power storage unit is supplied to the drive unit.

The first control unit may be configured to transmit a temporal condition for permitting an electric power transmission from the power feed apparatus, to the power feed apparatus using non-contact communication.

The first control unit may be configured to transmit a spatial condition for permitting an electric power transmission from the power feed apparatus, to the power feed apparatus using non-contact communication.

The first control unit may be configured to transmit a power feed multiplication factor from the power feed apparatus, to the power feed apparatus using non-contact communication.

A non-contact power feed system according to another embodiment of the present technology includes:

a plurality of power feed apparatuses that are allocated to a plurality of small areas within a predetermined area and are capable of transmitting electric power in a non-contact manner; and a mobile object apparatus that receives power feed from the power feed apparatus allocated to the small area adjacent to the mobile object apparatus and executes a movement operation on the predetermined area, the mobile object apparatus including an electric power reception unit that receives electric power transmitted from the power feed apparatus in a non-contact manner, a drive unit that executes the movement operation on the predetermined area, and an electric power storage unit that stores an electric power amount requisite for the movement operation to the small areas within a predetermined range from the adjacent small area.

The drive unit of the mobile object apparatus may be configured to be capable of executing a plurality of types of operations including the movement operation, and the power feed apparatuses may each include a second control unit that transmits, in accordance with the small area allocated to the power feed apparatus itself, information for restricting the types of operations that can be executed by the mobile object apparatus, to the mobile object apparatus using non-contact communication.

The predetermined area may be configured to be sectioned into a plurality of medium areas each including one or more small areas and transmit, for each of the medium areas, different electric power from the power feed apparatuses belonging to the corresponding medium area.

The non-contact power feed system may further include a main controller that judges the one or more small areas to which the mobile object apparatus may move next on the basis of information of the small area where the mobile object apparatus is positioned, and performs control to set the one or more power feed apparatuses allocated to the one or more small areas to a power-saving transmission state.

For attaining the objects described above, a method of driving a mobile object apparatus according to another embodiment of the present technology includes:

receiving, by an electric power reception unit, electric power transmitted in a non-contact manner from, out of a plurality of power feed apparatuses that are allocated to a plurality of small areas within a predetermined area and are capable of transmitting electric power in a non-contact manner, the power feed apparatus allocated to the small area adjacent to the mobile object apparatus;

executing, by a drive unit, a movement operation on the predetermined area; and storing, by an electric power storage unit, an electric power amount requisite for the movement operation to the small areas within a predetermined range from the adjacent small area.

Advantageous Effects of Invention

As described above, according to the present technology, improvements such as an improvement of convenience and multiple functionalization of a non-contact power feed system can be realized.

It should be noted that the effects described herein are not necessarily limited, and any effect described in the present disclosure may be obtained.

MODES FOR CARRYING OUT THE INVENTION

Hereinafter, embodiments of the present technology will be described with reference to the drawings.

1. First Embodiment

[Basic Configuration of Non-Contact Power Feed System]

Figure 1:
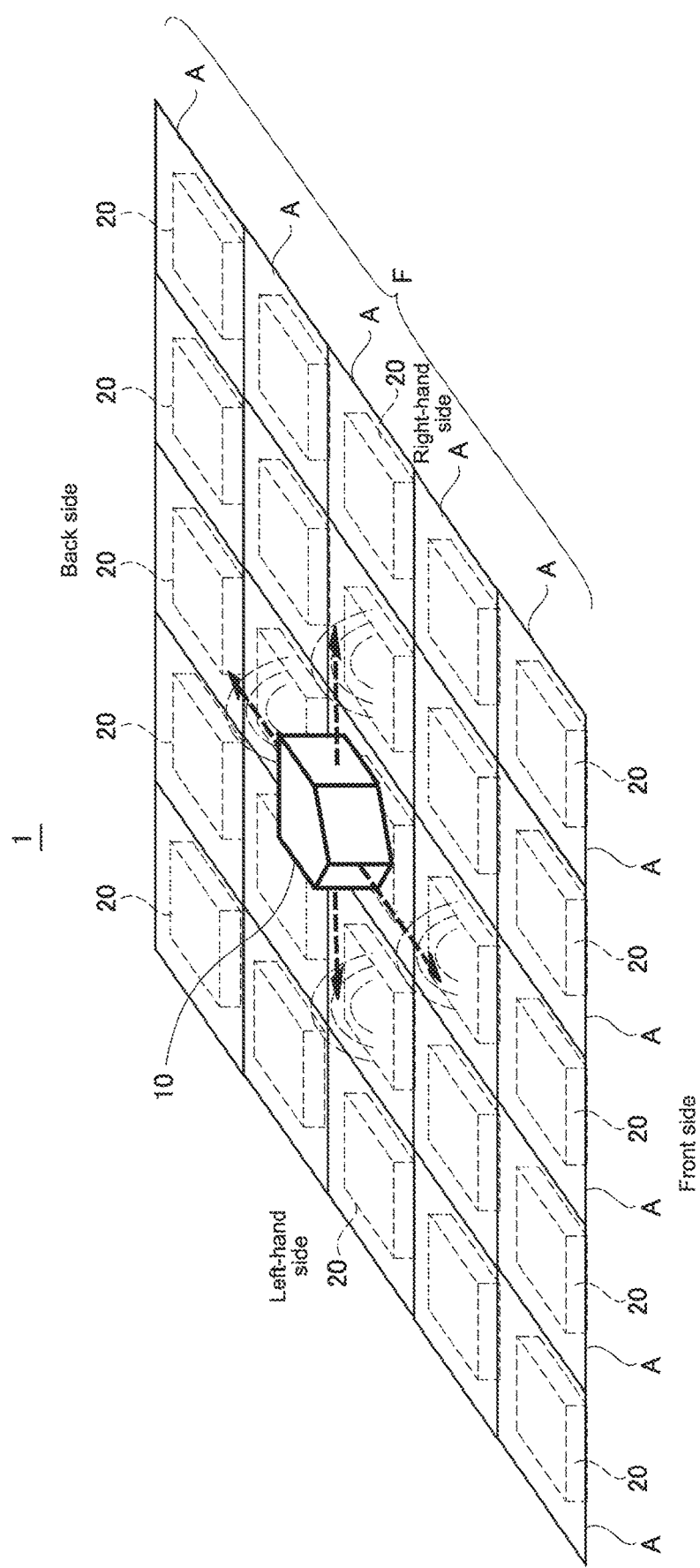
FIG. 1 A diagram showing a configuration of a non-contact power feed system 1 according to a first embodiment of the present technology.

FIG. 1 is a diagram showing a configuration of a non-contact power feed system according to a first embodiment of the present technology.

This non-contact power feed system 1 includes a mobile object apparatus 10 and a plurality of power feed apparatuses 20 that are respectively allocated to a plurality of areas A (corresponding to "small areas" in scope of claims) sectioning a field F (corresponding to "predetermined area" in scope of claims) as a movement space of the mobile object apparatus 10 and perform non-contact power feed to the mobile object apparatus 10. In the example shown in the figure, the field F is constituted of 5*5 (longitudinal*lateral) areas A, that is, a total of 25 areas A.

The mobile object apparatus 10 is capable of moving within the field F upon receiving electric power supplied in a non-contact manner from the power feed apparatus 20 allocated to the area A where the mobile object apparatus 10 is positioned in the field F. Further, the mobile object apparatus 10 is capable of performing non-contact communication with that power feed apparatus 20.

A non-contact electric power transmission between the mobile object apparatus 10 and the power feed apparatus 20 is carried out using, for example, a magnetic resonance system. The magnetic resonance system is a system that provides a coil and a capacitor that form a resonator on an electric power transmission side and an electric power reception side and causes the resonators to undergo magnetic field resonance so as to transmit electric power. Since electric power transmission efficiency is not lowered much with respect to an axial position deviation of the coils as compared to an electromagnetic induction system, the magnetic resonance system is more favorable as a system in a case of moving the mobile object apparatus 10 in a direction vertical to a coil axis direction. Non-contact communication between the mobile object apparatus 10 and the power feed apparatus 20 is carried out by near field wireless communication that uses both coils as antennas.

Hereinafter, configurations of the mobile object apparatus 10 and the power feed apparatus 20 configuring the non-contact power feed system 1 will be described in more detail.

First, the configuration of the power feed apparatus 20 will be described, and the mobile object apparatus 10 will be described after that.

[Configuration of Power Feed Apparatus 20]

Figure 2:
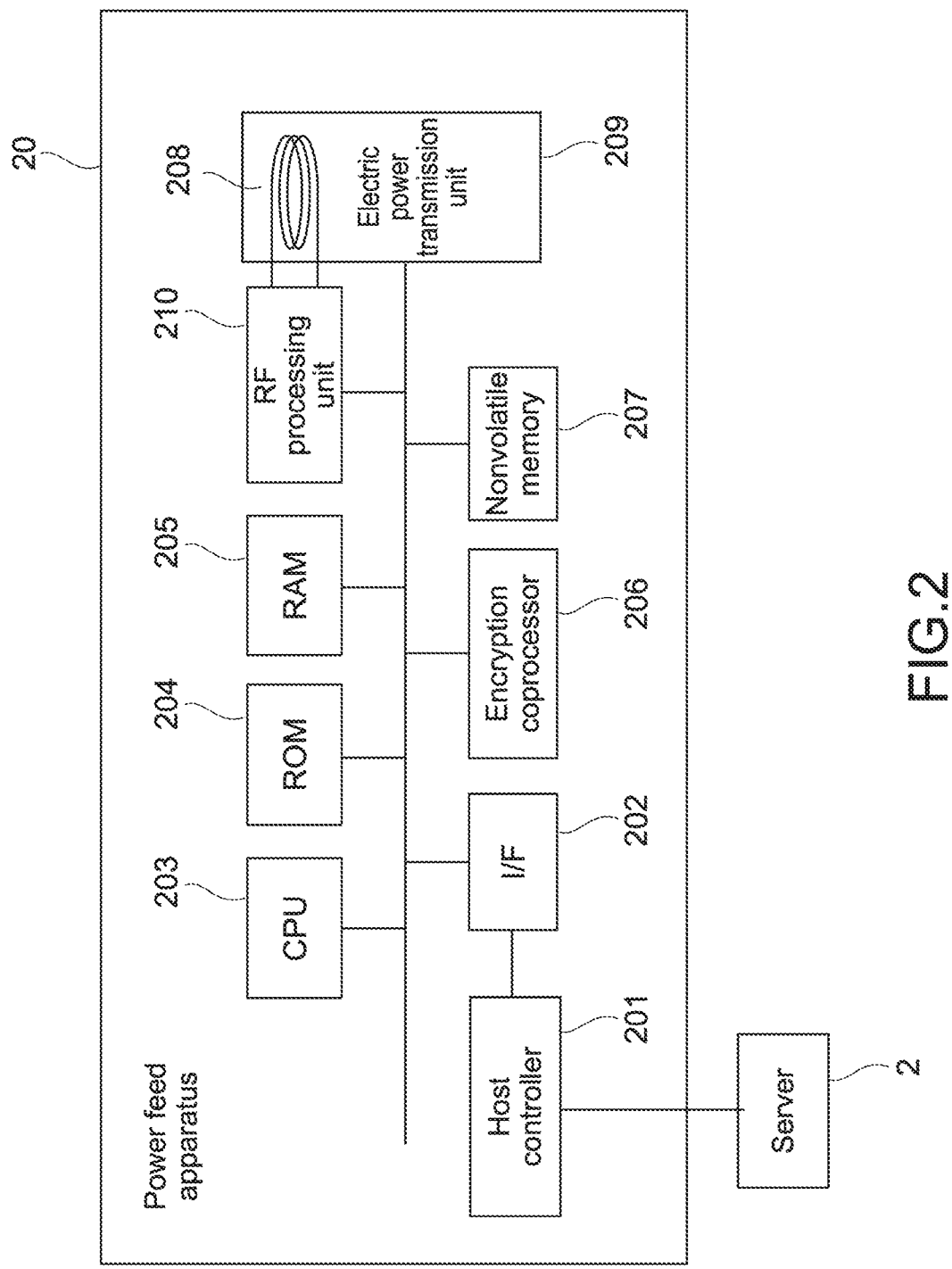
FIG. 2 A block diagram showing a configuration of a power feed apparatus 20 in the non-contact power feed system 1 shown in FIG. 1.

FIG. 2 is a block diagram showing the configuration of the power feed apparatus 20.

As shown in the figure, the power feed apparatus 20 includes a host controller 201 that communicates with a server 2 via a network such as a wireless LAN and a communication interface (I/F) 202 with respect to the host controller 201. The host controller 201 communicates with a CPU (Central Processing Unit) 203 that collectively controls the power feed apparatus 20 via the communication interface (I/F) 202.

The power feed apparatus 20 includes the CPU 203, a ROM (Read Only Memory) that stores a control program and the like, a RAM (Random Access Memory) 205 used as a working area of the CPU 203 and the like, an encryption coprocessor 206 used for an authentication or exchange of confidential information under control of the CPU 203, and a nonvolatile memory 207 that stores confidential information such as an encryption key used for an authentication, an identification ID of the power feed apparatus 20, and the like.

Further, the power feed apparatus 20 includes an electric power transmission unit 209 including an electric power transmission coil 208 and an RF (Radio Frequency) processing unit 210 constituted of a modulation/demodulation circuit that modulates and demodulates data, an amplifier that drives the electric power transmission coil 208 so as to perform communication using the electric power transmission coil 208 as an antenna during communication, and the like.

Figure 3:
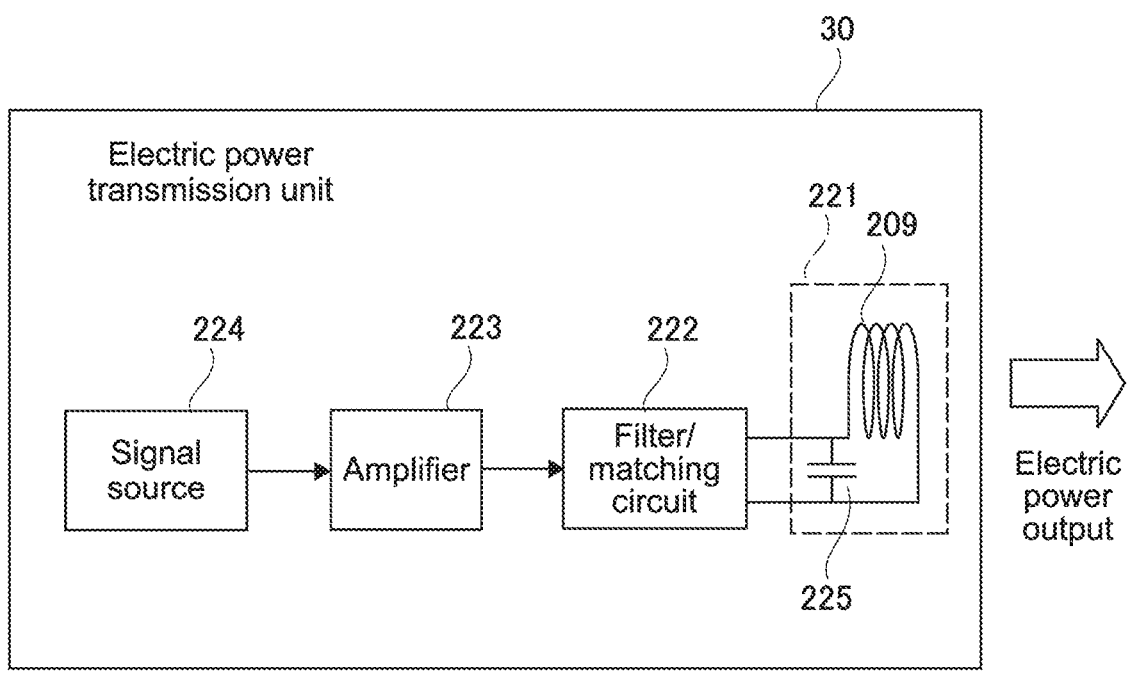
FIG. 3 A block diagram showing a configuration of an electric power transmission unit 209 of the power feed apparatus 20 shown in FIG. 2.

FIG. 3 is a block diagram showing a configuration of the electric power transmission unit 209 of the power feed apparatus 20.

The electric power transmission unit 209 includes an electric power transmission device unit 221, a filter and matching circuit (filter/matching circuit) 222, an amplifier 223, and a signal source 224 that generates high-frequency power.

The electric power transmission device unit 221 is configured to include the electric power transmission coil 208 and a capacitor 225 as a resonance device. The electric power transmission coil 208 and the capacitor 225 form a resonance circuit.

The filter and matching circuit 222 includes an impedance matching function regarding a power feed point of the electric power transmission coil 208. The impedance matching function is used to adjust an impedance so as to enhance electric power transmission efficiency. The amplifier 223 amplifies electric power of an electric signal from the signal source 224 and supplies it to the filter/matching circuit 222.

The signal source 224 generates high-frequency power for a non-contact electric power transmission. A switching amplifier or the like is used as this signal source 224 for generating high-frequency power with high efficiency.

The high-frequency power generated by the signal source 224 is applied to the electric power transmission coil 208 of the electric power transmission device unit 221 via the amplifier 223 and the filter/matching circuit 222.

[Configuration of Mobile Object Apparatus 10]

Figure 4:
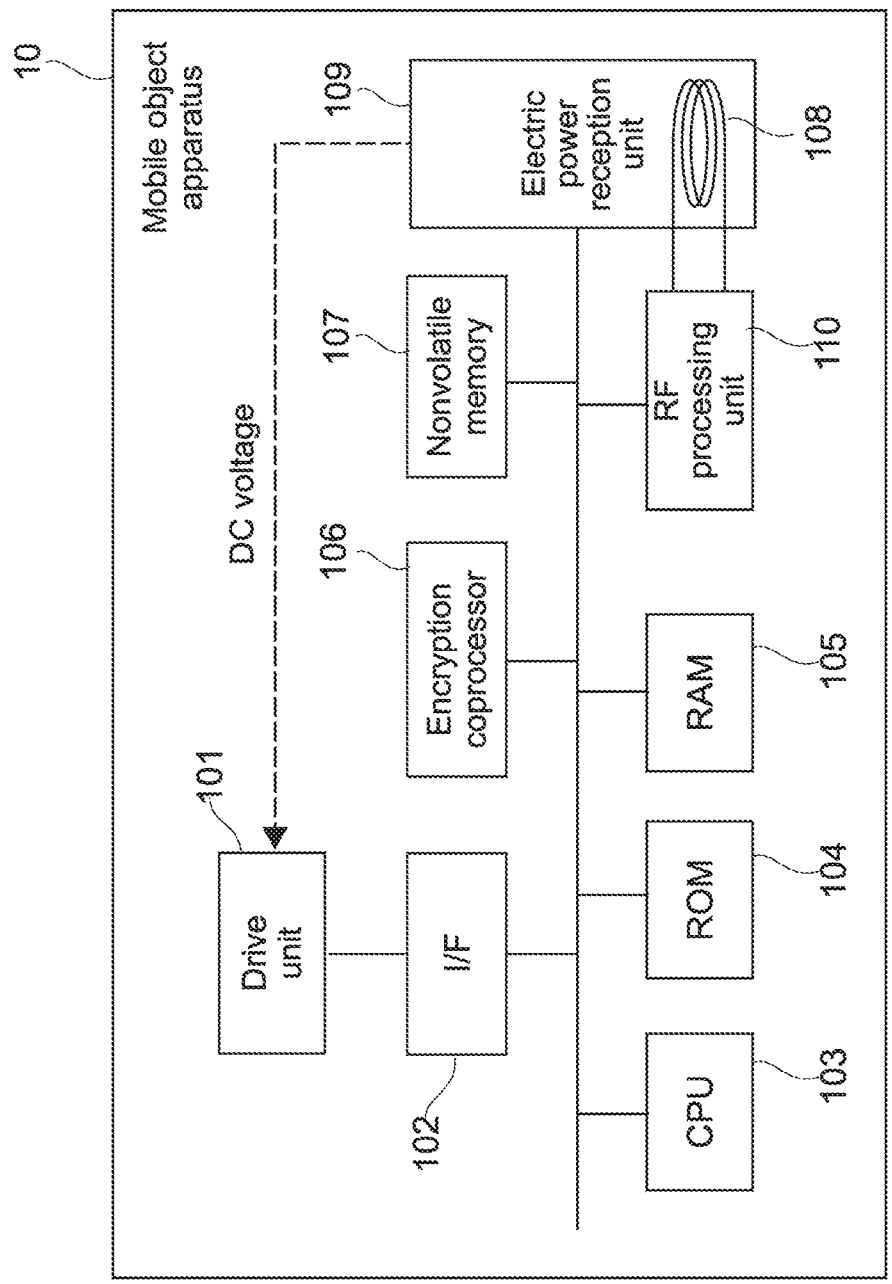
FIG. 4 A block diagram showing a configuration of a mobile object apparatus 10 in the non-contact power feed system 1 shown in FIG. 1.

FIG. 4 is a block diagram showing the configuration of the mobile object apparatus 10.

The mobile object apparatus 10 includes a communication interface (I/F) 102 with respect to a drive unit 101 of the mobile object apparatus 10. The drive unit 101 of the mobile object apparatus 10 is constituted of a servomotor that drives various mechanisms for causing the mobile object apparatus 10 to be operated so that it moves on a field, a drive circuit that supplies drive power to the servomotor, and the like. Specifically, the drive unit 101 generates power for causing the mobile object apparatus 10 to execute a predetermined operation. The drive unit 101 communicates with a CPU (Central Processing Unit) 103 that collectively controls the mobile object apparatus 10 via the communication interface (I/F) 102.

The mobile object apparatus 10 includes the CPU 103, a ROM (Read Only Memory) 104 that stores a control program and the like, a RAM (Random Access Memory) 105 used as a working area of the CPU 103 and the like, an encryption coprocessor 106 used for an authentication or exchange of confidential information under control of the CPU 103, and a nonvolatile memory 107 that stores confidential information such as an encryption key used for an authentication, an identification ID of the mobile object apparatus 10 itself, and the like.

Further, the mobile object apparatus 10 includes an electric power reception unit 109 including an electric power reception coil 108 and an RF (Radio Frequency) processing unit 110 constituted of a modulation/demodulation circuit that modulates and demodulates data, an amplifier that amplifies an output of the electric power reception coil 108 during communication, and the like.

Figure 5:
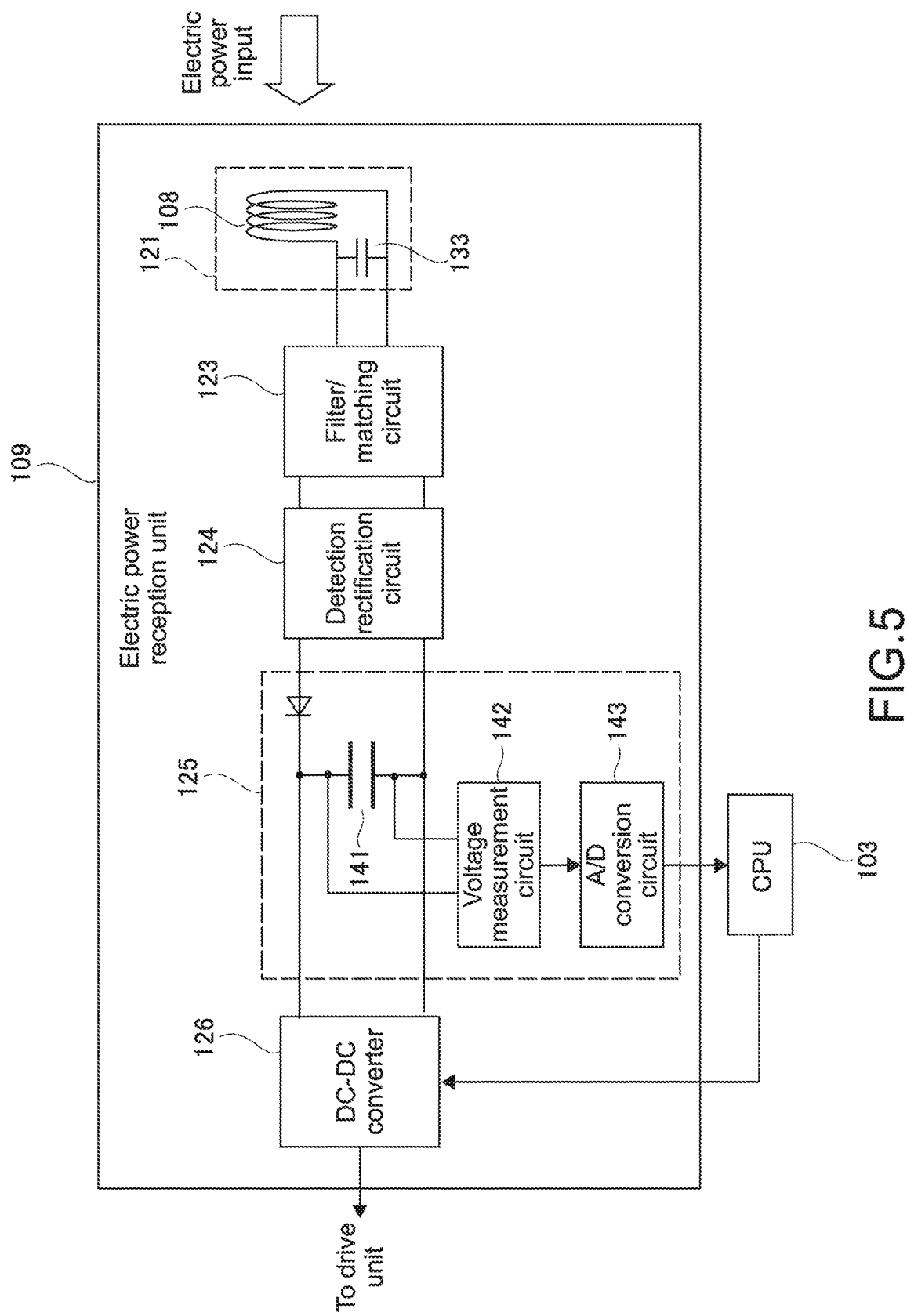
FIG. 5 A block diagram showing a configuration of an electric power reception unit 109 of the mobile object apparatus 10 shown in FIG. 4.

FIG. 5 is a block diagram showing a configuration of the electric power reception unit 109 of the mobile object apparatus 10.

The electric power reception unit 109 includes an electric power reception device unit 121, a filter and matching circuit (filter/matching circuit) 123, a detection rectification circuit 124, a capacitance circuit 125 (corresponding to "electric power storage unit" in scope of claims), and a DC-DC converter 126.

The electric power reception device unit 121 is configured to include the electric power reception coil 108 and a capacitor 131 as a resonance device. The electric power reception coil 108 and the capacitor 131 form a resonance circuit.

The filter and matching circuit 123 includes an impedance matching function regarding a connection portion with respect to a load of the electric power reception coil 108. The impedance matching function is used to adjust an impedance so as to enhance electric power reception efficiency.

The detection rectification circuit 124 rectifies received AC power to obtain direct-current (DC) power, and supplies the power to the capacitance circuit 125.

The capacitance circuit 125 includes a capacitance device 141 capable of storing an electric power amount requisite for the drive unit 101 to execute an operation once at most, a voltage measurement circuit 142 that detects a potential difference between electrodes of the capacitance device 141, and an A/D conversion circuit 143 for notifying the CPU 103 of a measurement value obtained by the voltage measurement circuit 142.

The DC-DC converter 126 generates a DC voltage to be applied to the drive unit 101 from a voltage between the electrodes of the capacitance device 141 on the basis of a control signal from the CPU 103.

[Basic Operations in Non-Contact Electric Power Transmission]

In the non-contact power feed system 1 of this embodiment, electric power of signals from the signal source 224 having a predetermined frequency is amplified by the amplifier 223 in the electric power transmission unit 209 of the power feed apparatus 20. The amplified electric power is supplied to the electric power transmission coil 208 via the filter/matching circuit 222. An AC magnetic field is generated around the electric power transmission coil 208 due to an AC current flowing to the electric power transmission coil 208.

On the other hand, in the mobile object apparatus 10, if the electric power reception coil 108 of the electric power reception unit 109 is present in the AC magnetic field, an AC current is generated in the electric power reception coil 108 due to a magnetic field resonance of the electric power transmission coil 208 and the electric power reception coil 108. The AC current generated in the electric power reception coil 108 is supplied to the detection rectification circuit 124 via the filter/matching circuit 123, a DC current is supplied to the capacitance circuit 125 from the detection rectification circuit 124, and the capacitance device 141 in the capacitance circuit 125 is charged.

Upon receiving a control signal from the CPU 103, the DC-DC converter 126 generates a predetermined constant voltage to be applied to the drive unit 101 from the voltage between the electrodes of the capacitance device 141, and applies it to the drive unit 101. Accordingly, the drive unit 101 is driven.

[Control of Non-Contact Power Feed System 1]

In the non-contact power feed system 1 of this embodiment, for preventing the mobile object apparatus 10 from being stolen or the like, the power feed apparatus 20 authenticates the mobile object apparatus 10 as a communication target and performs, in a case where the authentication succeeds, control of turning on the electric power transmission from the power feed apparatus 20 to the mobile object apparatus 10.

Figure 6:
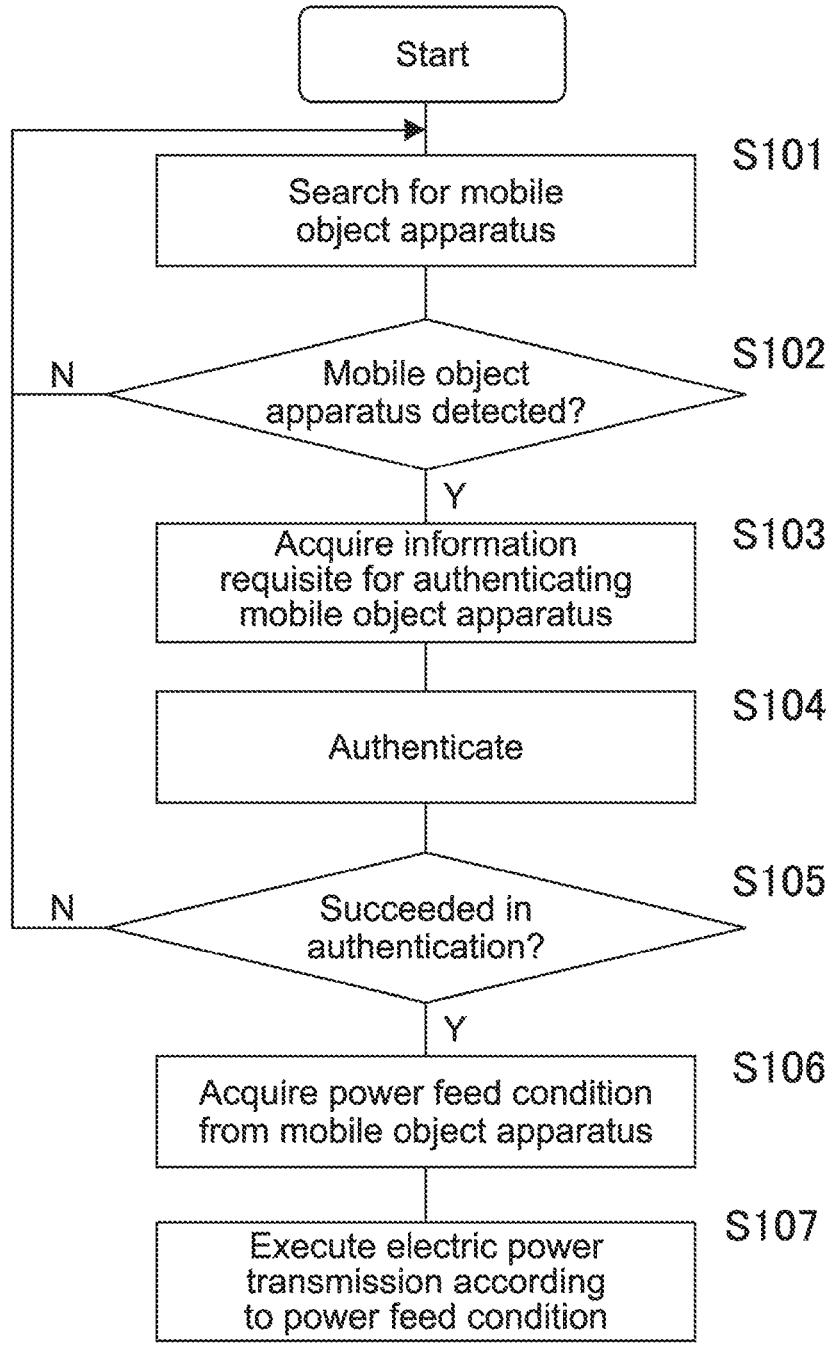
FIG. 6 A flowchart related to electric power transmission control by a CPU 203 of the power feed apparatus 20.

FIG. 6 is a flowchart related to electric power transmission control by the CPU 203 of the power feed apparatus 20.

First, the CPU 203 of the power feed apparatus 20 searches for the mobile object apparatus 10 in an area A that the power feed apparatus 20 itself covers using non-contact communication (Step S101). Upon detecting the mobile object apparatus 10 (Y in Step S102), the CPU 203 of the power feed apparatus 20 acquires information requisite for authenticating the mobile object apparatus 10, which includes an identification ID, by non-contact communication (Step S103).

On the basis of the acquired information requisite for authenticating the mobile object apparatus 10 and information requisite for the authentication, that is stored in the nonvolatile memory 207 of the power feed apparatus 20, the CPU 203 of the power feed apparatus 20 carries out authentication processing of judging whether the mobile object apparatus 10 is an apparatus that can be used in the non-contact power feed system 1 (Step S104). In a case of failing in this authentication processing (N in Step S105), the processing returns to Step S101, and the search for the mobile object apparatus 10 is carried out again.

In a case of succeeding in the authentication (Y in Step S105), the CPU 203 of the power feed apparatus 20 acquires a power feed condition stored in the mobile object apparatus 10 from the mobile object apparatus 10 using non-contact communication (Step S106). The power feed condition includes a power feed start condition, a power feed multiplication factor, a power feed stop condition, and the like.

In accordance with the acquired power feed condition, the CPU 203 of the power feed apparatus 20 controls the electric power transmission unit 209 to transmit electric power (Step S107). It should be noted that the electric power transmission is put to a standby state or stopped depending on a content of the power feed condition.

[Regarding Power Feed Condition]

The power feed condition is a condition set individually for the mobile object apparatus 10.

The power feed condition includes a temporal condition, a spatial condition, a power feed multiplication factor, and the like.

The temporal condition includes a time condition for permitting an electric power transmission of the power feed apparatus 20, a time condition for prohibiting the electric power transmission, and the like. These time conditions include an electric power transmission standby time after an authentication, a time length from a start to end of the electric power transmission, a time slot designated by an absolute time, and the like.

The spatial condition includes an area for which the electric power transmission of the power feed apparatus 20 is permitted, an area for which the electric power transmission is prohibited, and the like. By this spatial condition, the mobile object apparatus 10 can be supplied with or prevented from being supplied with electric power only from a specific area.

The power feed multiplication factor is used in a case where electric power transmitted from the power feed apparatus 20 is wished to be controlled on the mobile object apparatus 10 side. The power feed multiplication factor is selected within a range from 0 to a maximum value, for example. The CPU 203 of the power feed apparatus 20 controls the electric power transmission unit 209 to transmit electric power corresponding to this power feed multiplication factor. Accordingly, a time required for the electric power amount requisite for the mobile object apparatus 10 to execute a movement once to be stored in the capacitance device 141 can be changed.

[Control of Mobile Object Apparatus 10]

Figure 7:
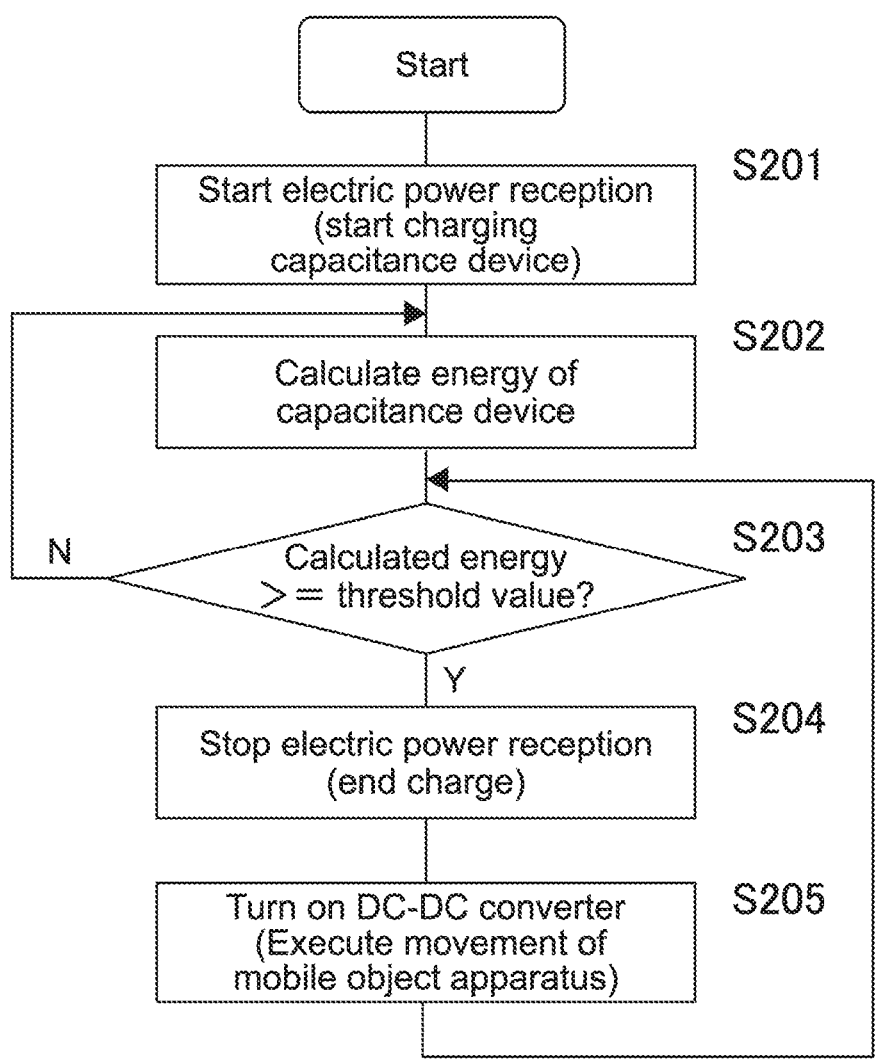
FIG. 7 A flowchart of operations of the mobile object apparatus 10 shown in FIG. 4.

FIG. 7 is a flowchart of operations of the mobile object apparatus 10.

The mobile object apparatus 10 receives the electric power transmission from the power feed apparatus 20 allocated to the area A where the mobile object apparatus 10 itself is positioned, by the electric power reception unit 109. Accordingly, potentials are accumulated in the capacitance device 141 of the capacitance circuit 125 (Step S201). Meanwhile, a potential difference between the electrodes of the capacitance device 141 is detected by the voltage measurement circuit 142, and a value of the potential difference detected by the voltage measurement circuit 142 is converted into a digital value by the A/D conversion circuit 143 to be notified to the CPU 103 of the mobile object apparatus 10.

The CPU 103 of the mobile object apparatus 10 calculates an electric power amount stored in the capacitance device 141 (accumulated energy) on the basis of the acquired value (Step S202) and evaluates the calculated value of the electric power amount by comparing it with a threshold value. As the threshold value, a value of an electric power amount requisite for the mobile object apparatus 10 to execute a movement operation once is prepared in advance.

The CPU 103 of the mobile object apparatus 10 compares the calculated value of the electric power amount and the threshold value. In a case where the calculated value of the electric power amount has not reached the threshold value (N in Step S203), the CPU 103 receives the electric power transmission from the power feed apparatus 20 as it is and continues to charge the capacitance device 141.

When the calculated value of the electric power amount reaches the threshold value (Y in Step S203), the CPU 103 of the mobile object apparatus 10 turns on the DC-DC converter 126. Accordingly, charges accumulated in the capacitance device 141 are supplied to the DC-DC converter 126 as a DC current, and a constant drive voltage is applied to the drive unit 101 from the DC-DC converter 126. As a result, the drive unit 101 of the mobile object apparatus 10 is driven, and one movement operation is executed.

After that, the CPU 103 of the mobile object apparatus 10 returns to Step S203 to determine again whether the value of the electric power amount stored in the capacitance device 141 has reached the threshold value due to charging. Here, because the capacitance device 141 including a capacitance with which the value of the electric power amount stored in the capacitance device 141 becomes smaller than the threshold value at a timepoint one movement operation is ended, is used, the CPU 103 of the mobile object apparatus 10 turns off the DC-DC converter 126 until the value of the electric power amount stored in the capacitance device 141 reaches the threshold value since ending the one movement operation.

Figure 8:
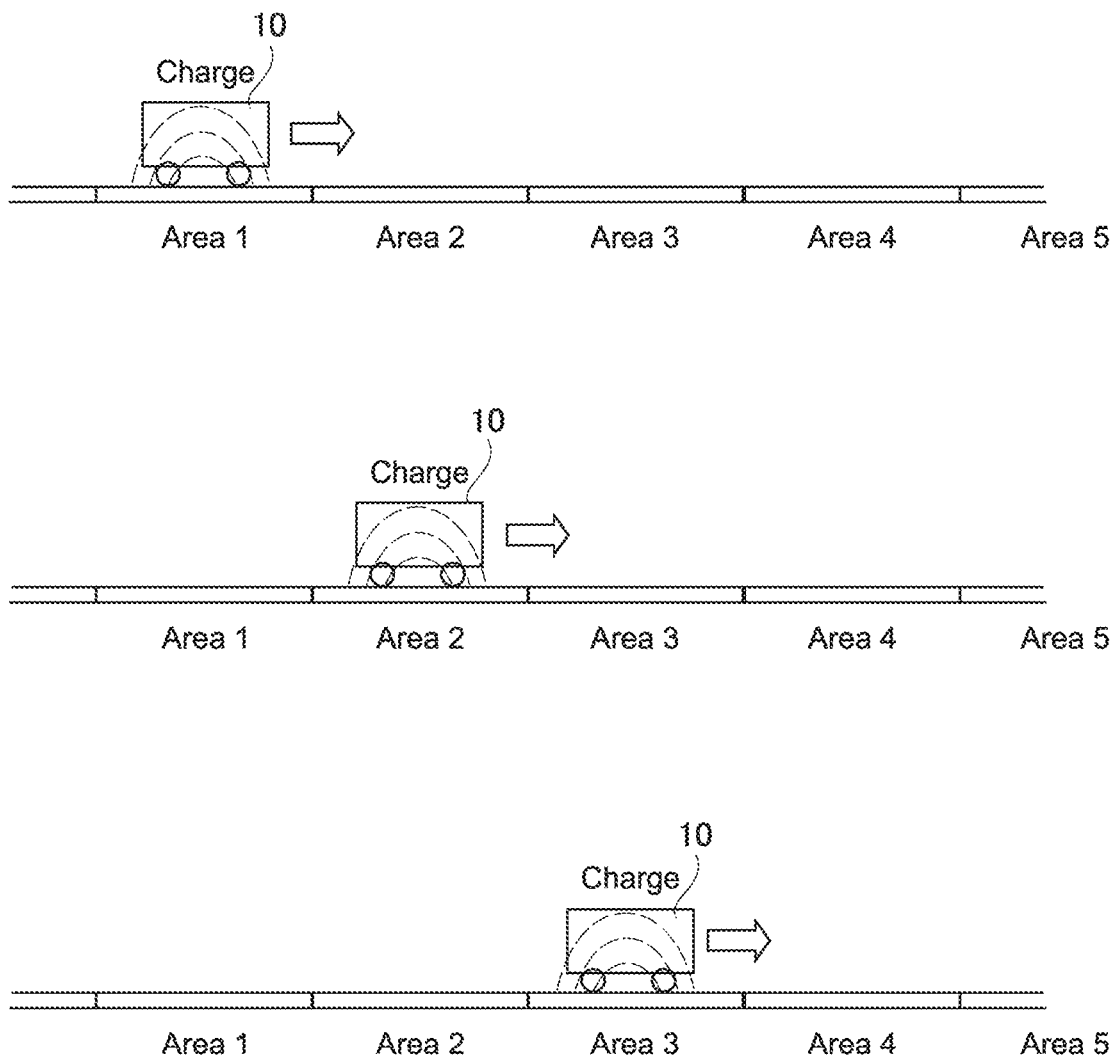
FIG. 8 A diagram showing a relationship between power charge and movement of the mobile object apparatus 10.

FIG. 8 is a diagram showing a relationship between power charge and movement of the mobile object apparatus 10.

The mobile object apparatus 10 charges the capacitance device 141 upon receiving the electric power transmission from the power feed apparatus 20 allocated to an area 1 and moves from the area 1 to an area 2 using electric power obtained from the charges accumulated in the capacitance device 141. Similarly, also in the area 2, the mobile object apparatus 10 recharges the mobile object apparatus 10 upon receiving the electric power transmission from the power feed apparatus 20 and moves from the area 2 to an area 3 using electric power obtained from the charges accumulated in the capacitance device 141. In this way, the mobile object apparatus 10 can continue moving among areas while receiving the electric power transmission from the power feed apparatuses 20 allocated to the respective areas.

Incidentally, the mobile object apparatus 10 not only takes a simple linear movement as shown in FIG. 8 but may also change its direction to move to an adjacent area.

Figure 9:
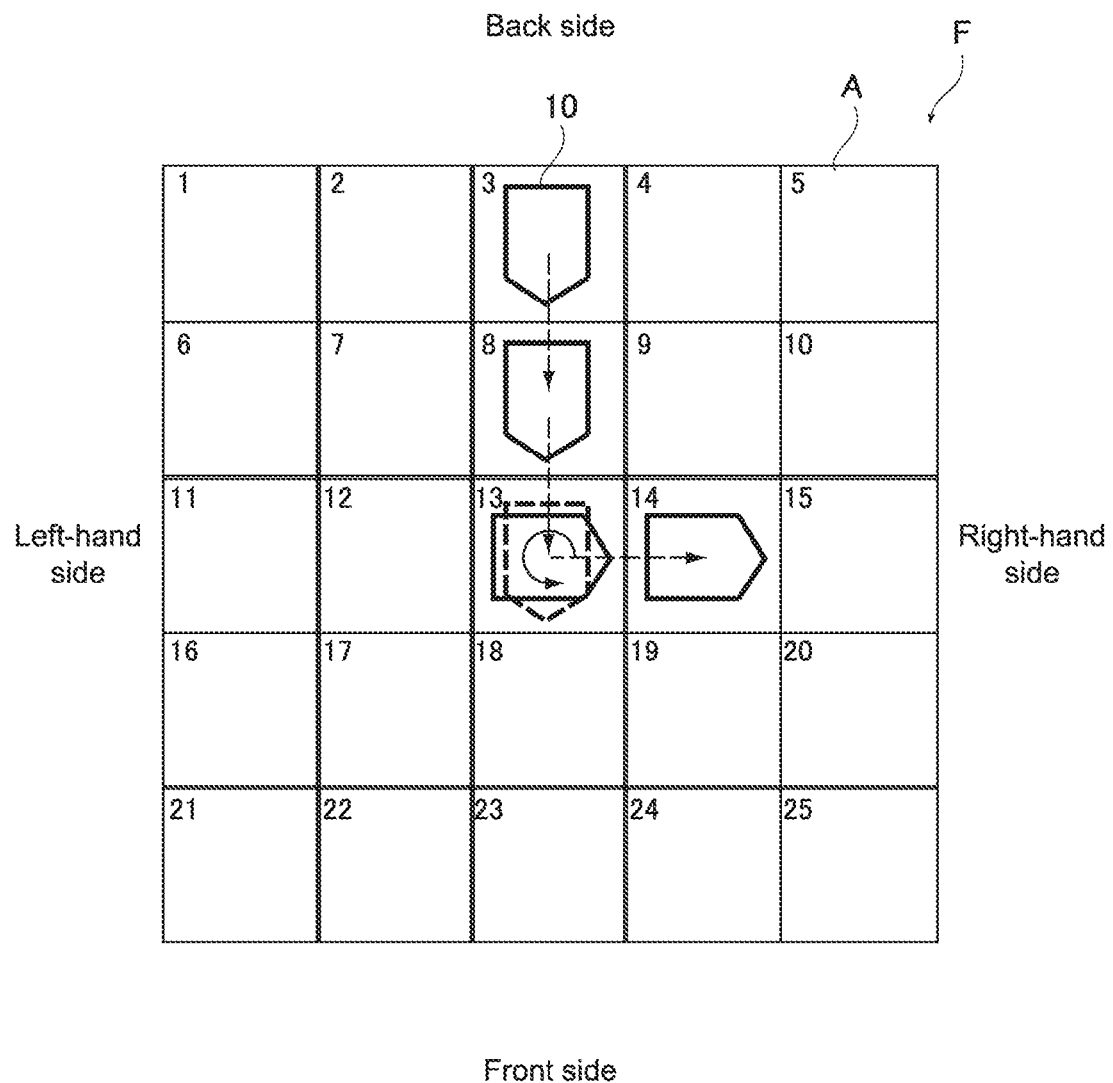
FIG. 9 A diagram showing an example of an operation of moving the mobile object apparatus 10 after changing its direction.

FIG. 9 is a diagram showing an example of an operation in which the mobile object apparatus 10 moves after changing its direction.

First, the mobile object apparatus 10 moves from the area 3 to an area 8 and then moves to an area 13. The operation up to here is only a simple linear movement. Next, the mobile object apparatus 10 changes its direction from the area 13 and moves to an adjacent area 14 on a right-hand side. At this time, the mobile object apparatus 10 makes a rotation of a maximum of 270 degrees for a change in the direction and a movement corresponding to one area, which requires that much energy. Therefore, the threshold value needs to be set in accordance with the value of that requisite electric power amount.

It should be noted that although the case where the rotation and movement are consecutively executed as one operation is assumed herein, the rotation and movement may be regarded as different operations. In this case, the threshold value only needs to be set in accordance with a value of the rotation or movement that requires larger energy.

[Control of Power Feed Apparatuses 20]

Next, control of the power feed apparatuses 20 will be described.

The CPU 203 of the power feed apparatus 20 is capable of executing control as follows.

(Movement Restriction of Mobile Object Apparatus 10)

There are cases where the mobile object apparatus 10 is configured such that a user can selectively execute a plurality of types of operations. For example, there is a configuration in which the user can select an operation to be executed by the mobile object apparatus 10 as appropriate using a controller mounted on the mobile object apparatus 10 or a controller wirelessly connected to the mobile object apparatus 10.

Figure 10:
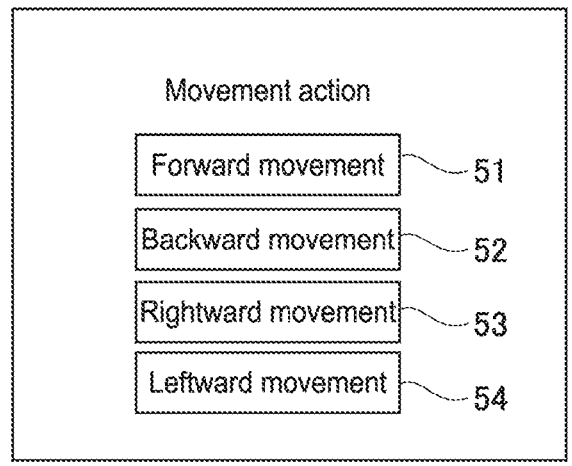
FIG. 10 A diagram showing an example of an operation screen of a controller for operating the mobile object apparatus 10.

FIG. 10 is a diagram showing an example of an operation screen of a controller for operating the mobile object apparatus 10.

In this operation screen, buttons 51, 52, 53, and 54 for one or more operations currently executable by the mobile object apparatus 10 are displayed. As the user operates the button 51, 52, 53, or 54 of the target operation on the operation screen, the controller determines the operation associated with the operated button 51, 52, 53, or 54, generates a command for causing the mobile object apparatus 10 to execute this operations, and transmits the command to the mobile object apparatus 10. The mobile object apparatus 10 executes the operation in accordance with the received command.

Currently, in the operation screen of the controller, only the buttons 51, 52, 53, and 54 related to the operations executable in the area A where the mobile object apparatus 10 is present are displayed.

Figure 11:
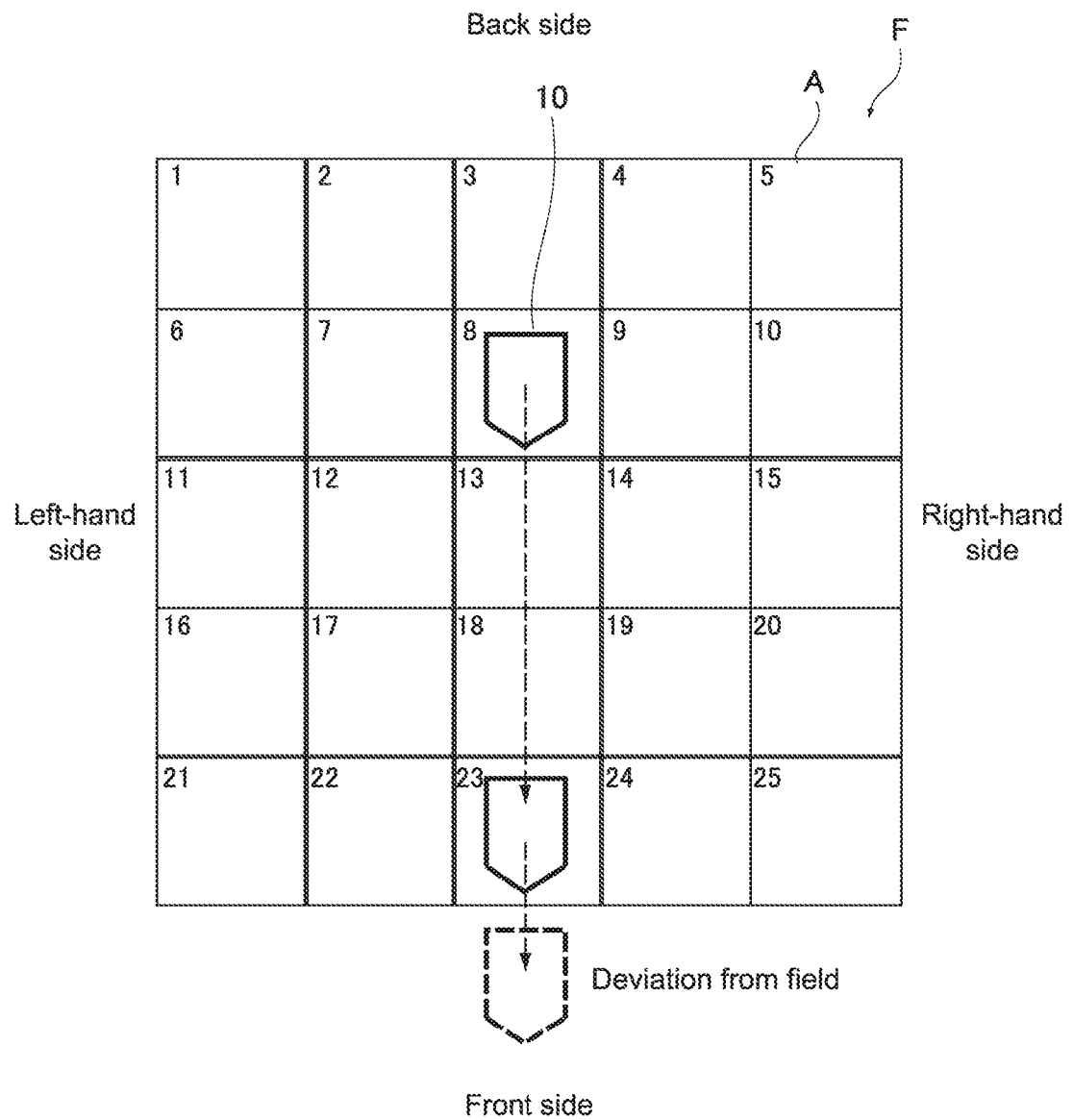
FIG. 11 A diagram showing a movement example of the mobile object apparatus 10 within a field F.

For example, it is assumed that as shown in FIG. 11, the mobile object apparatus 10 has moved from the area 8 one area at a time in a front direction and reached an area 23 at the very edge of the field F on the front side, in accordance with an instruction of the operation selected by the user using the controller. When the mobile object apparatus 10 is present in the area 8, 13, or 18, the selectable operations presented in the operation screen of the controller are 4 types of operations, that is, the "forward movement", "backward movement", "rightward movement", and "leftward movement" as shown in FIG. 10.

It should be noted that the "backward movement" refers to a movement in which the mobile object apparatus 10 is rotated 180 degrees and moves to an area one area ahead in a forward direction when seen from the mobile object apparatus 10. The "rightward movement" refers to a movement in which the mobile object apparatus 10 is rotated 90 degrees in a leftward direction on paper and moves to an area one area ahead in the forward direction when seen from the mobile object apparatus 10. The "leftward movement" refers to a movement in which the mobile object apparatus 10 is rotated 90 degrees in a rightward direction on paper and moves to an area one area ahead in the forward direction when seen from the mobile object apparatus 10.

Figure 12:
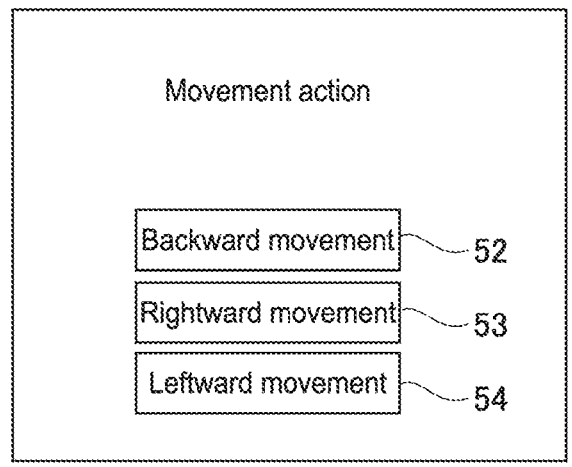
FIG. 12 A diagram showing a change of the operation screen of the controller for operating the mobile object apparatus 10.

Further, in a case where the mobile object apparatus 10 is present in the area 23, the power feed apparatus 20 allocated to this area 23 communicates with the mobile object apparatus 10 in a non-contact manner and transmits operation restriction information for prohibiting execution of the "forward movement" as the operation of the mobile object apparatus 10. In accordance with this operation restriction information, the CPU 103 of the mobile object apparatus 10 transmits control information to the controller to prohibit the user from selecting the "forward movement" operation in the operation screen of the controller. In accordance with this control information, the controller prohibits the user from selecting the "forward movement" operation by, for example, deleting the button for the "forward movement" operation from the operation screen as shown in FIG. 12. Accordingly, the operations selectable by the user are restricted to 3 types, that is, the "backward movement", the "rightward movement", and the "leftward movement".

The intention of this control is as follows.

The area 23 is an area at the very edge of the field F on the front side, so when the forward movement of the mobile object apparatus 10 is permitted in the area 23, the mobile object apparatus 10 goes out of the field F. When the mobile object apparatus 10 goes out of the field F, the mobile object apparatus 10 cannot receive the electric power transmission from the power feed apparatus 20, and charges accumulated in the capacitance device 141 become 0 there, with the result that execution of a next movement operation for returning the mobile object apparatus 10 back to the field F becomes impossible. The problem described above can be solved by prohibiting the selection of an operation that induces the deviation from the field F.

It should be noted that by setting field information in the mobile object apparatus 10, similar control can be realized by individual control of the mobile object apparatus 10.

(Electric Power Control in Segment Unit)

The field F may be sectioned into a plurality of segments S (corresponding to "medium areas" in scope of claims) each constituted of one or more areas A so that different electric power are transmitted from the power feed apparatuses 20 belonging to the corresponding segment S, for each of the segments S.

Figure 13:
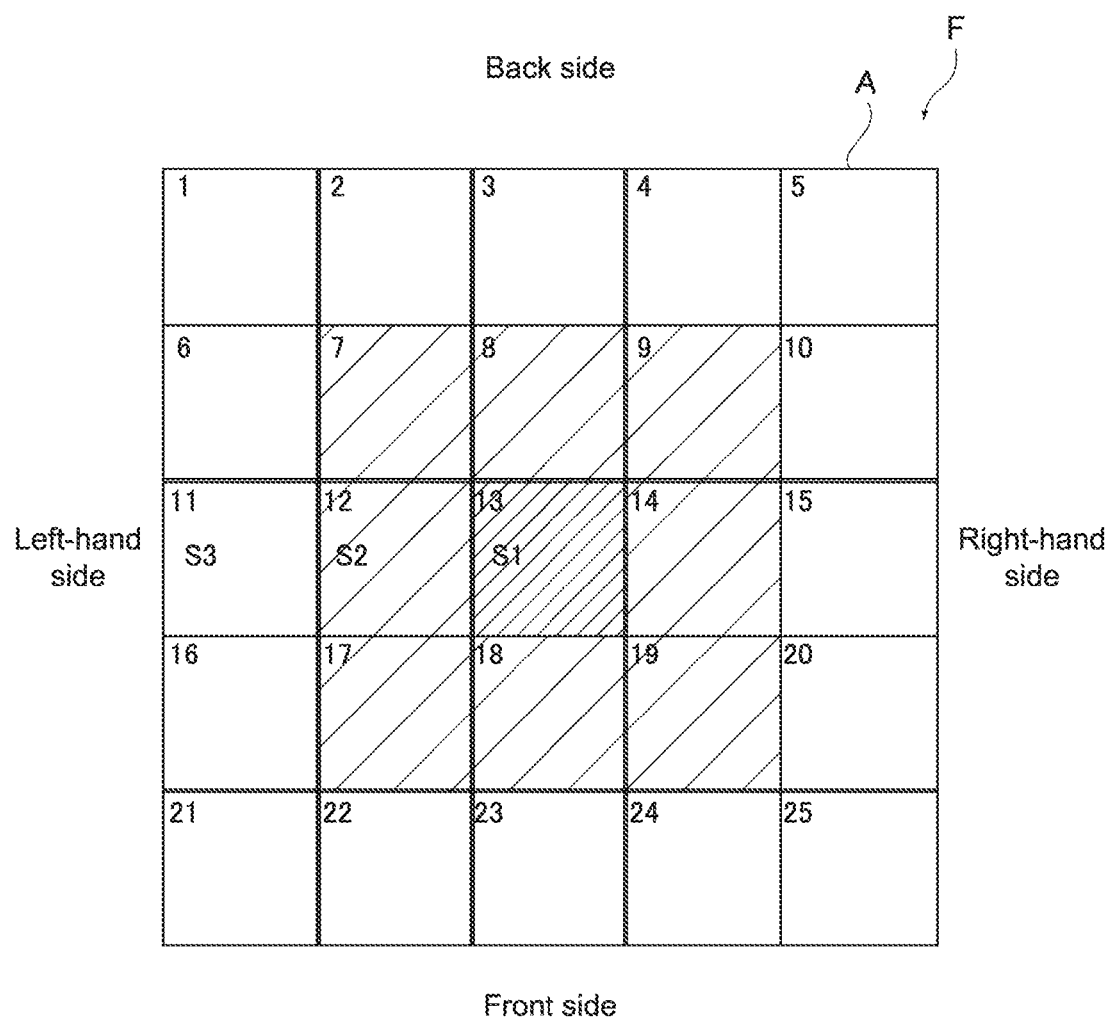
FIG. 13 A diagram showing an arrangement example of a plurality of segments S sectioning the field F.

FIG. 13 is a diagram showing an example of the plurality of segments S sectioning the field F.

Three segments S1, S2, and S3 are provided in the field shown in the figure. The center area A13 belongs to the segment S1. A total of 8 areas 7, 8, 9, 12, 14, 17, 18, and 19 surrounding the center area A13 belong to the segment S2. The remaining outermost circumferential areas belong to the segment S3.

Here, assuming that a magnitude relationship of electric power transmitted from the respective power feed apparatuses 20 is S1>S2>S3, a movement velocity of the mobile object apparatus 10 can be made higher as the position comes closer to the center of the field F.

Figure 14:
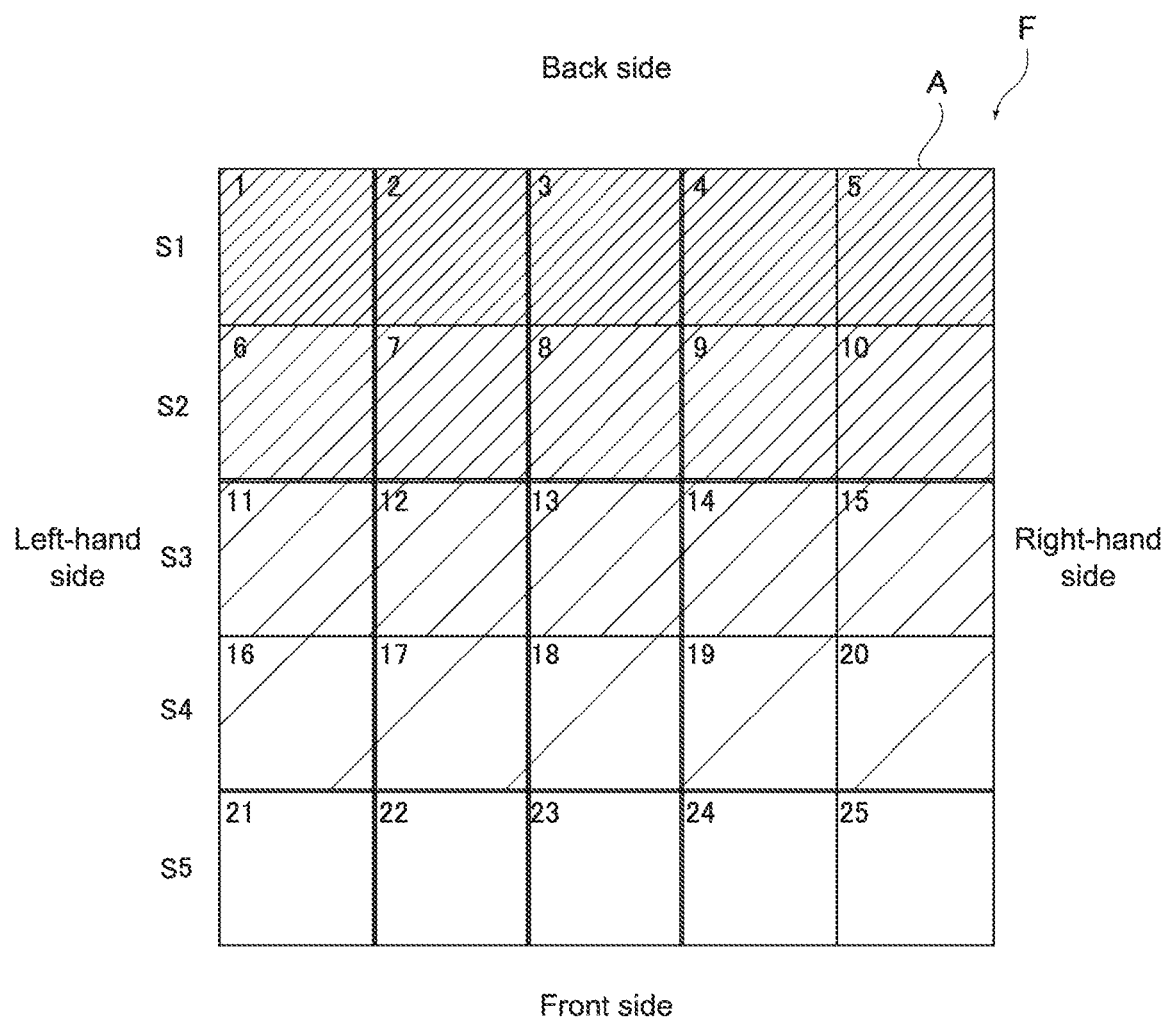
FIG. 14 A diagram showing another arrangement example of the plurality of segments S sectioning the field F.

Further, FIG. 14 is a diagram showing an example where the field F is divided into 5 segments S1, S2, S3, S4, and S5 such that electric power gradually becomes smaller from the back side toward the front side.

(Power Feed State Control of Plurality of Power Feed Apparatuses 20)

For saving power of the power feed apparatuses 20 in the entire field F, there is a method of stopping an electric power transmission of the power feed apparatuses 20 that are allocated to the areas A where the mobile object apparatus 10 is not positioned. This method, however, requires a certain amount of rise time from the electric power transmission stop state. Therefore, in detecting that the mobile object apparatus 10 has entered the area A thereof by non-contact communication and starting the electric power transmission after performing an authentication, a long time is required before power charge of the capacitance device 141 of the mobile object apparatus 10 is started due to the time loss described above. In this regard, it is possible to cause the power feed apparatuses 20 to operate in a state where electric power to be transmitted is suppressed low (hereinafter, referred to as "power-saving transmission state") and raise electric power after authenticating the mobile object apparatus 10, to thus shorten the time required before the operation is executed. However, this method inhibits power saving since the electric power transmission units 209 of all the power feed apparatuses 20 are constantly operated in the power-saving transmission state.

Figure 15:
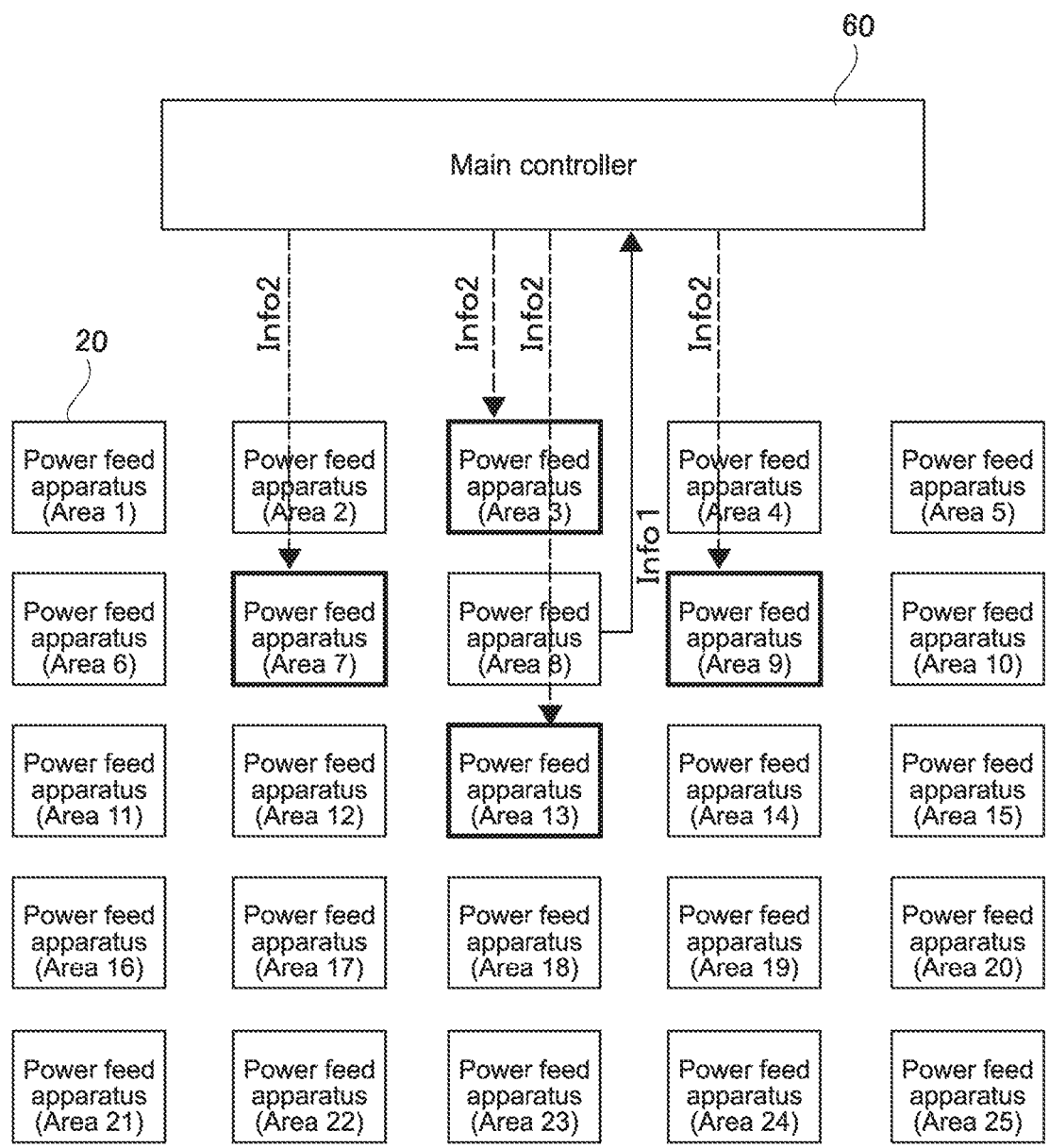
FIG. 15 A block diagram showing a configuration for realizing power feed state control of the plurality of power feed apparatuses 20.

FIG. 15 is a block diagram showing a configuration for realizing the power feed state control of the plurality of power feed apparatuses 20.

In this example, a main controller 60 capable of communicating with each of the power feed apparatuses 20 acquires information indicating which area A the mobile object apparatus 10 is currently positioned at from the power feed apparatuses 20, and judges the areas A to which the mobile object apparatus 10 may move next. The main controller 60 transmits an instruction to set the power feed apparatuses 20 allocated to the areas A to which the mobile object apparatus 10 may move next to the power-saving transmission state, to those power feed apparatuses 20.

Accordingly, the time loss before an operation is executed after the mobile object apparatus 10 is authenticated can be shortened to a time required for the power feed apparatuses 20 to raise electric power to a necessary value from the power-saving transmission state. Further, from the viewpoint of power saving, the time during which the power feed apparatuses 20 are operated in the power-saving transmission state is little time, and in addition, the number of power feed apparatuses 20 to be operated in the power-saving transmission state is only a limited number (power feed apparatuses 20 allocated to areas A to which mobile object apparatus 10 may move next), and thus do not become a large setback regarding the entire power saving.

This control by the main controller 60 may be executed by the server 2 connected with each of the power feed apparatuses 20 via a network or may be executed by the CPU 203 of each of the power feed apparatuses 20 by directly exchanging information among the power feed apparatuses 20 without intervention of the main controller 60 or the server.

Figure 16:
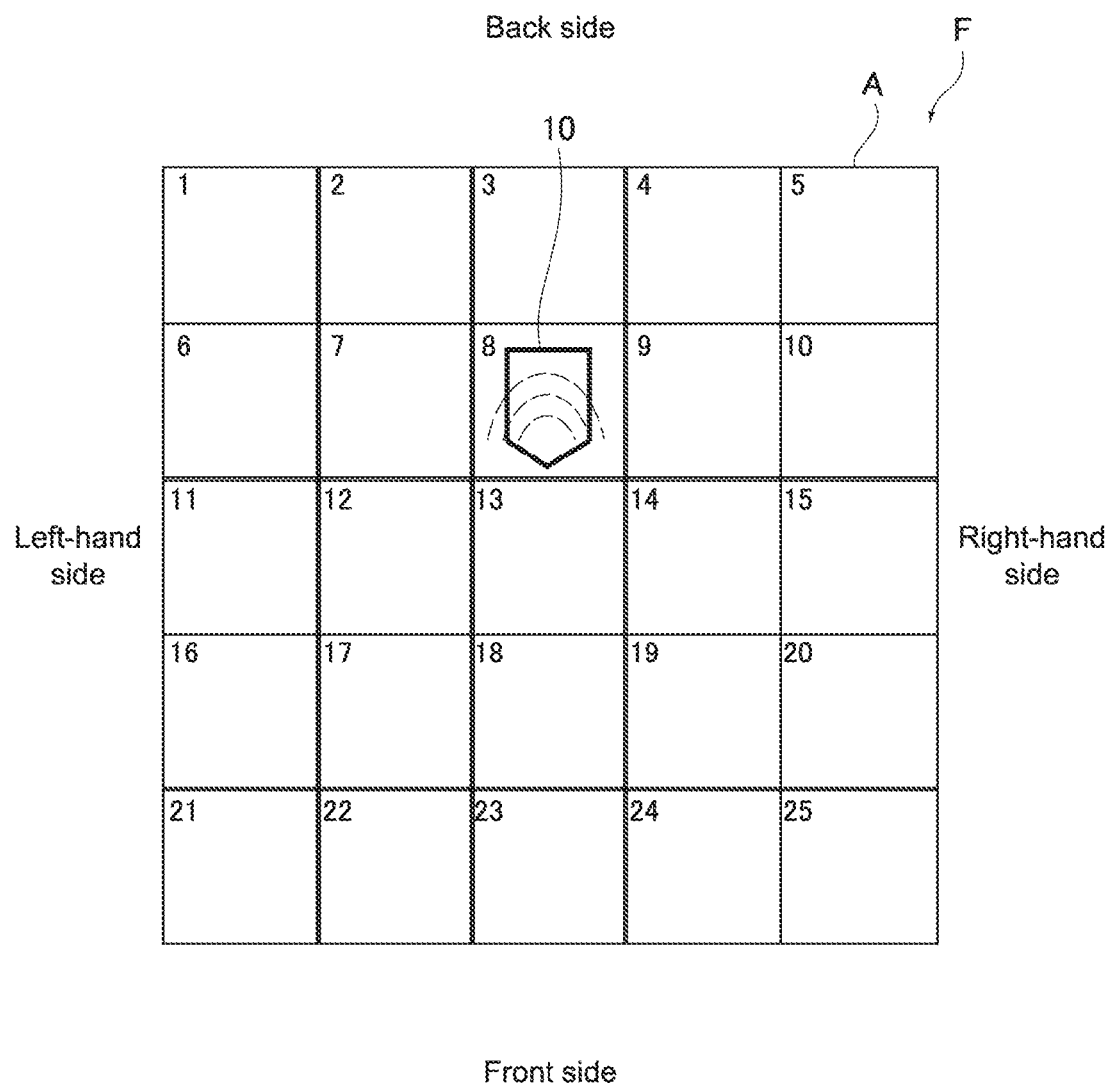
FIG. 16 A diagram showing a specific example of the power feed state control of the plurality of power feed apparatuses 20.

FIG. 16 is a diagram showing a specific example of the power feed state control of the plurality of power feed apparatuses 20 described above.

It is assumed that the mobile object apparatus 10 is present in the area 8 and the electric power transmissions of the power feed apparatuses 20 in the respective areas excluding the area 8 are in a pause state.

As a way the power feed apparatuses 20 are put to the pause state regarding the electric power transmission, for example, there is a case where the power feed apparatuses 20 are put to the pause state from an initial state or a case where, due to the mobile object apparatus 10 not being detected after the electric power transmission is executed with respect to the mobile object apparatus 10 detected last time, the mobile object apparatus 10 is assumed to have moved to an area of another power feed apparatus 20 so that the power feed apparatus 20 is thus put to the pause state.

The CPU 203 of the power feed apparatus 20 in the area 8 transmits a notification Info1 (FIG. 15) that notifies that the mobile object apparatus 10 is present in the area 8 to the main controller 60. The main controller 60 possesses layout information of each of the areas A configuring the field F and a correspondence table for each of the areas A and each of the power feed apparatuses 20. Upon receiving the notification Info1 from the power feed apparatus 20 in the area 8, the main controller 60 transmits a notification Info2 (FIG. 15) that instructs the electric power transmission of the power feed apparatuses 20 in the respective peripheral areas A closest to that area 8 to shift from the pause state to the power-saving transmission state.

Figure 17:
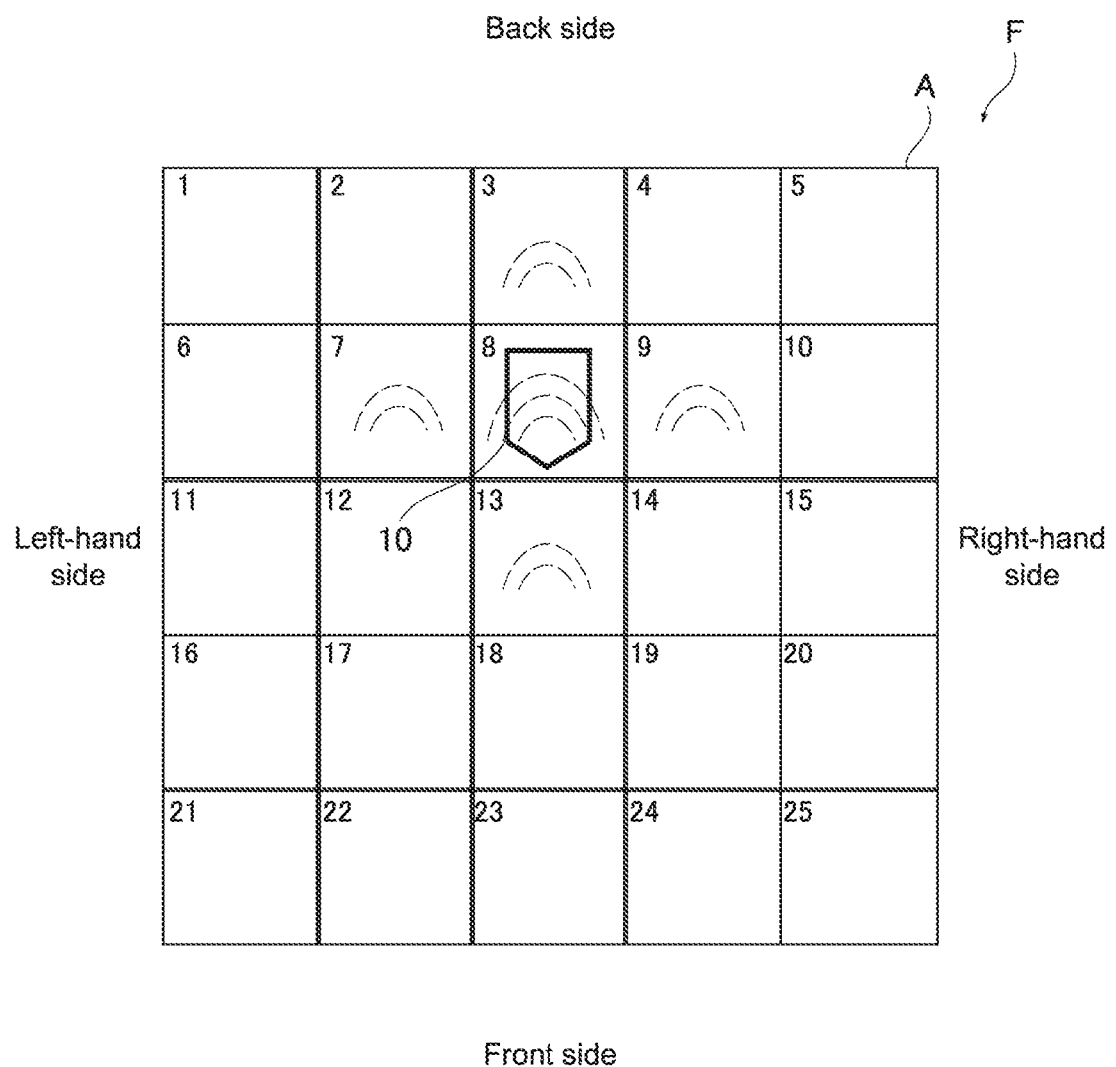
FIG. 17 A diagram showing a specific example of the power feed state control of the plurality of power feed apparatuses 20 subsequent to FIG. 16.

The respective peripheral areas A closest to the area 8 are the areas 3, 7, 9, and 13 in this example, that is, areas that can be reached with a movement of one operation from the area 8. As a result, as shown in FIG. 17, the electric power transmissions of the power feed apparatuses 20 in the areas 3, 7, 9, and 13 are switched from the pause state to the power-saving transmission state.

Figure 18:
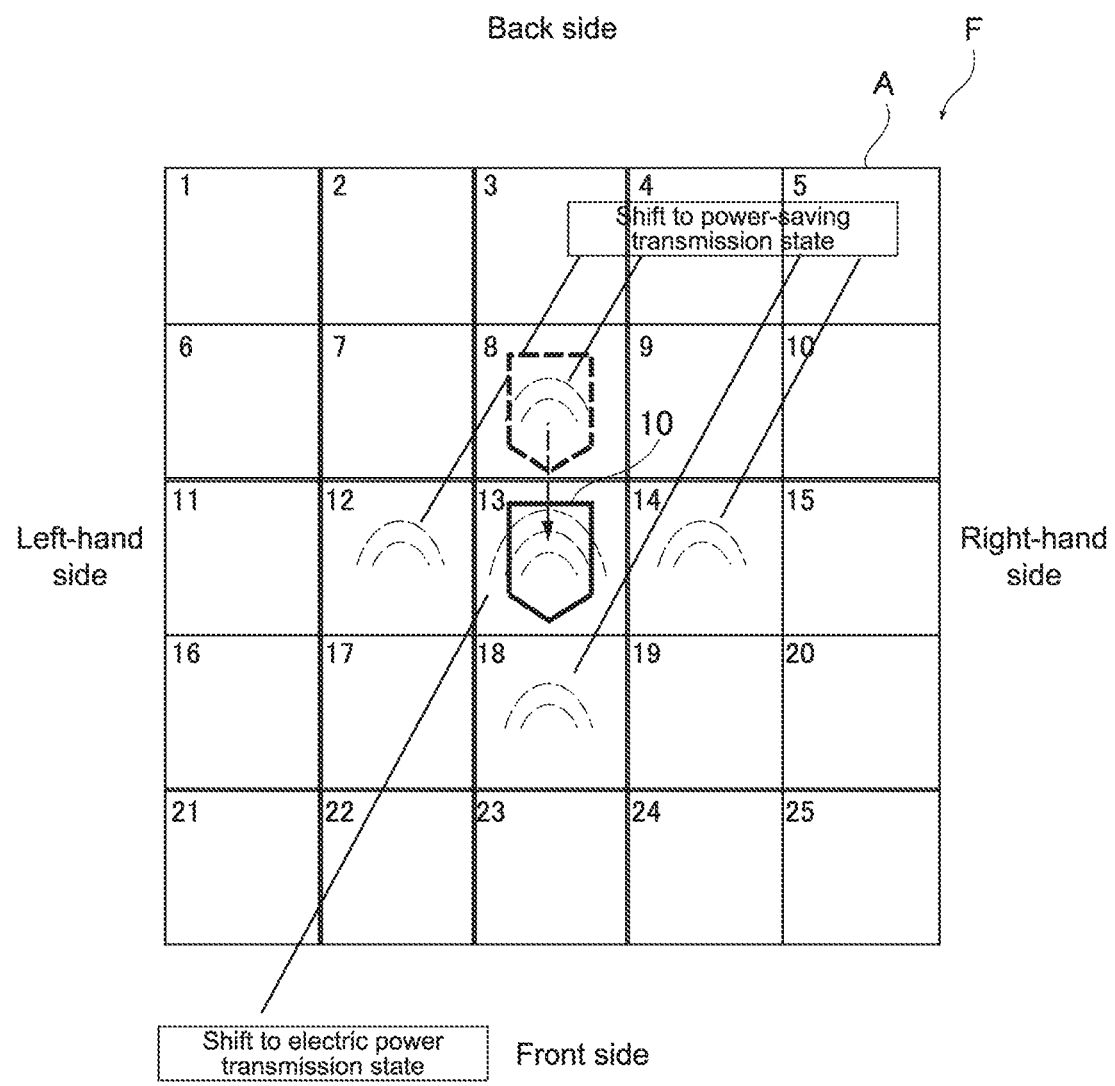
FIG. 18 A diagram showing a specific example of the power feed state control of the plurality of power feed apparatuses 20 subsequent to FIG. 17.

Here, it is assumed that an instruction for a "forward movement" operation has been given to the mobile object apparatus 10 by a user operation using the controller. Accordingly, the mobile object apparatus 10 is moved from the area 8 to the area 13 as shown in FIG. 18. After the power feed apparatus 20 in the area 13 detects the mobile object apparatus 10 by communicating with the mobile object apparatus 10 and authenticates the mobile object apparatus 10, electric power is raised up to a necessary value to shift to an electric power transmission state. At this time, since the electric power transmission is already started in the power-saving transmission state in the area 13, it is possible to readily shift to the electric power transmission state.

Moreover, since the non-contact electric power transmission in which electric power is suppressed low is started before the authentication is performed under this control, a charge time of the capacitance device 141 in the mobile object apparatus 10 can be shortened. Accordingly, a time required before an operation is executed after the mobile object apparatus 10 moves to the next area can be shortened.

As the mobile object apparatus 10 moves to the area 13, the electric power transmissions of the power feed apparatuses 20 in the respective peripheral areas 8, 12, 14, and 18 closest to the area 13 are switched to the power-saving transmission state by similar control as shown in FIG. 18. The areas 3, 7, and 9 that have been operating in the power-saving transmission state up to here shift to the pause state.

Figure 19:
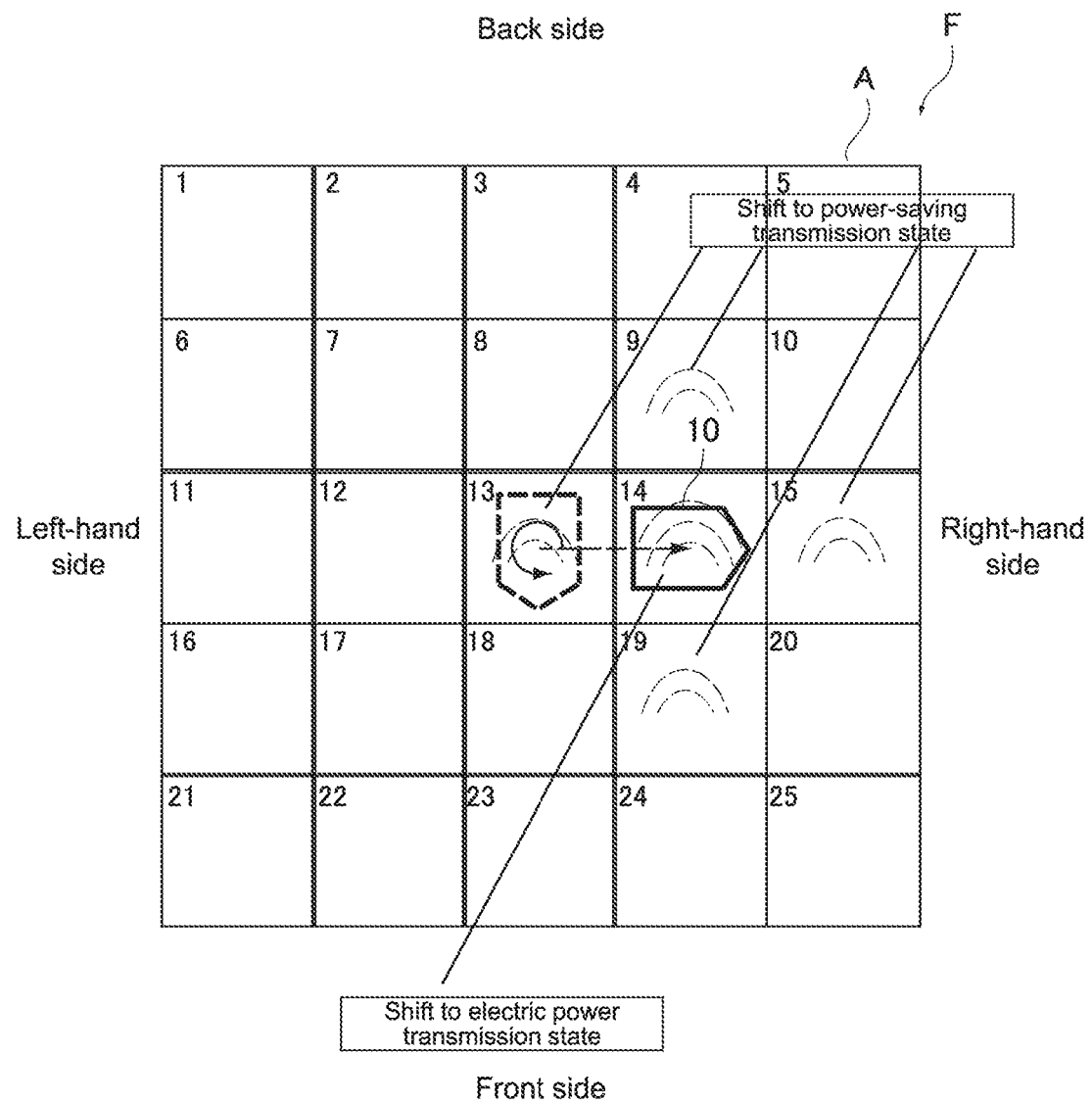
FIG. 19 A diagram showing a specific example of the power feed state control of the plurality of power feed apparatuses 20 subsequent to FIG. 18.

Next, as shown in FIG. 19, in a case where an instruction for a "rightward movement" operation is given to the mobile object apparatus 10 by a user operation using the controller or the like, the mobile object apparatus 10 moves from the area 13 to the area 14. After the power feed apparatus 20 in the area 14 detects the mobile object apparatus 10 by communicating with the mobile object apparatus 10 and authenticates the mobile object apparatus 10, electric power is raised up to a necessary value to shift to an electric power transmission state, and the electric power transmissions of the power feed apparatuses 20 in the respective peripheral areas 9, 13, 15, and 19 closest to the area 13 are switched to the power-saving transmission state. The areas 8, 12, and 18 that have been operating in the power-saving transmission state up to here shift to the pause state.

[Effect of Non-Contact Power Feed System 1 of this Embodiment, Etc.]

As described above, in the non-contact power feed system 1 of this embodiment, operations of the mobile object apparatus 10 are consecutively executed while the charges or electric power amount stored in the capacitance device 141 are/is substantially fully consumed every time one operation such as a movement of the mobile object apparatus 10 is carried out. Therefore, in a case where the mobile object apparatus 10 is deviated from the field F where it is supplied with electric power from the power feed apparatuses 20, the operation of the mobile object apparatus 10 cannot be executed at that deviated position. Therefore, it is possible to prevent an accident, runaway, and the like due to the mobile object apparatus 10 executing some kind of an operation outside the field F from occurring.

Further, with the configuration that does not require a large-capacity battery or the like in the mobile object apparatus 10 in the non-contact power feed system 1 of this embodiment, a decrease in weight and low costs of the mobile object apparatus 10 can be realized.

It should be noted that, for example, the mobile object apparatus 10 only needs to be an apparatus that executes operations using electric power, such as a cleaning support robot, a walking support robot, a security support robot, an electric car, and a robot.

For example, the cleaning support robot, the walking support robot, and the security support robot can be used in specific buildings such as various facilities including homes, hospitals, care facilities, schools, libraries, and the like. By providing a field of the non-contact power feed system in the facilities, an activity range conforming to the purpose of the robots can be restricted. Therefore, safeties in using the robots in the facilities can be improved. Further, since the robot can only be used inside that field, it is unlikely that the robot will be stolen. Accordingly, security management with respect to theft and the like also becomes easy.

Similarly, by providing a field of the non-contact power feed system on vehicle roads in specific areas, even nationwide, it is also possible to cause the electric car to travel without having to charge at power supply stands.

2. Second Embodiment

Next, as a second embodiment of the present technology, a non-contact power feed system that uses a game battle robot as the mobile object apparatus 10 will be described.

[Humanoid Game Battle Robot]

There are various types such as a humanoid type, an animal type, and a vehicle type for the game battle robot as the mobile object apparatus 10. Herein, the humanoid game battle robot will be described.

Figure 20:
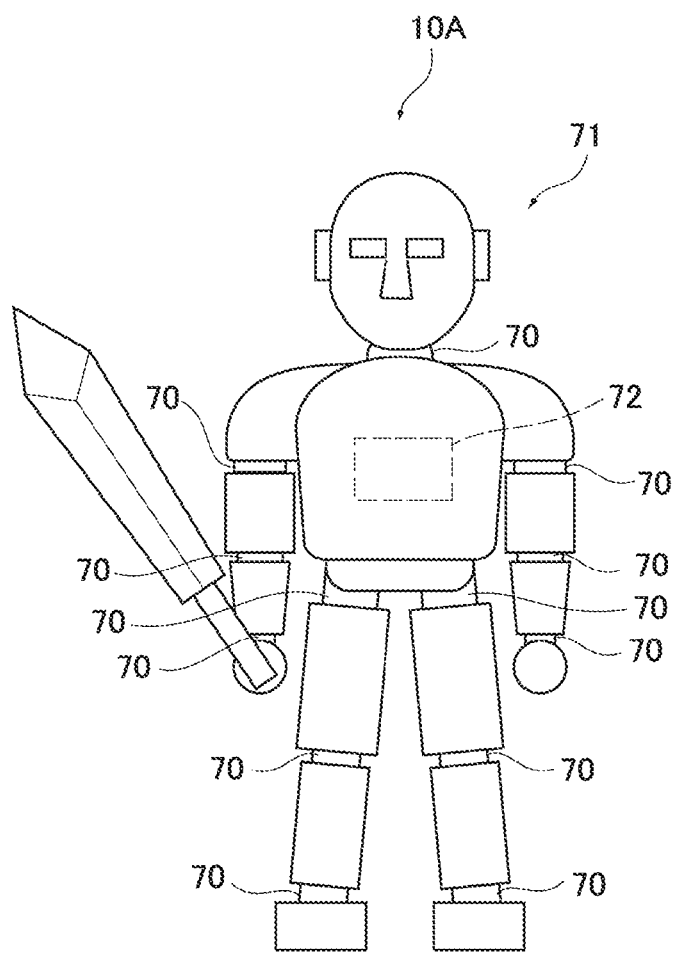
FIG. 20 A front view showing an example of a humanoid game battle robot according to a second embodiment of the present technology.

FIG. 20 is a front view showing an example of the humanoid game battle robot.

This humanoid game battle robot 10A includes a body portion 71 including a plurality of joint portions 70 requisite for operations, a plurality of drive units (not shown) such as a servomotor for individually driving the respective joint portions 70, a control unit 72 that controls the respective drive units, and the like.

The drive units and the control unit 72 are incorporated into the body portion 71. The control unit 72 includes a ROM that stores a control program and the like, a RAM as a working area, and a CPU that executes the control program using the RAM. The control unit 72 performs control so as to drive the respective necessary joint portions 70 at appropriate angles, velocities, and timings on the basis of the control program in order to execute a desired operation.

The operations of this game battle robot 10A roughly include a movement, an attack, a rotation, and the like.

Figure 21:
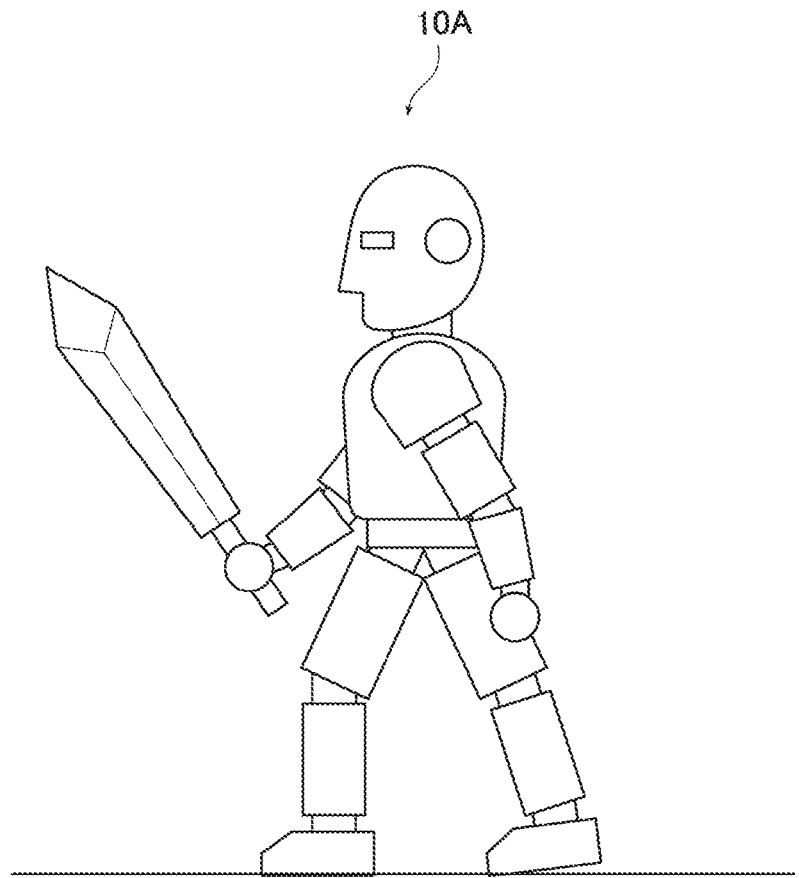
FIG. 21 A side view showing a movement of the game battle robot shown in FIG. 20.

FIG. 21 is a side view showing the movement of this game battle robot 10A. This game battle robot 10A is capable of moving on the field F by bipedal walking or the like, for example.

Figure 22:
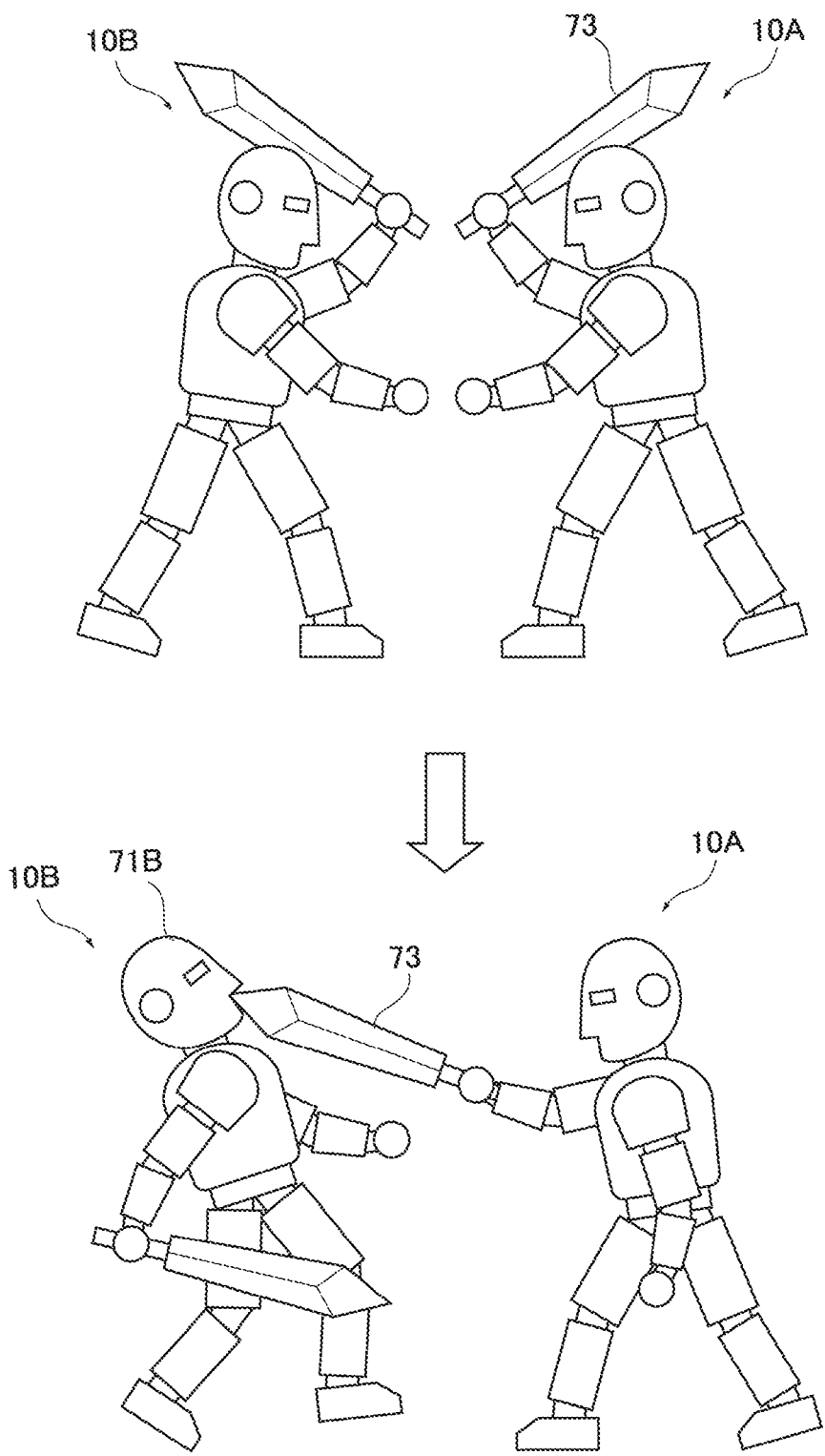
FIG. 22 A side view showing an attack operation of the game battle robot shown in FIG. 20.

FIG. 22 is a side view showing the attack operation of the game battle robot 10A.

The game battle robot 10A is capable of performing an attack operation using an equipped weapon 73. Winning or losing of the match may be determined by hitting a body portion 71B of a counterpart game battle robot 10B with the weapon 73 or causing the counterpart game battle robot 10B to fall, for example.

The rotation operation means rotating the game battle robot 10A in one area A.

Next, a game system (non-contact power feed system) that uses this game battle robot 10A as the mobile object apparatus 10 will be described.

Two or more game battle robots 10A and 10B are arranged in the field F.

Figure 23:
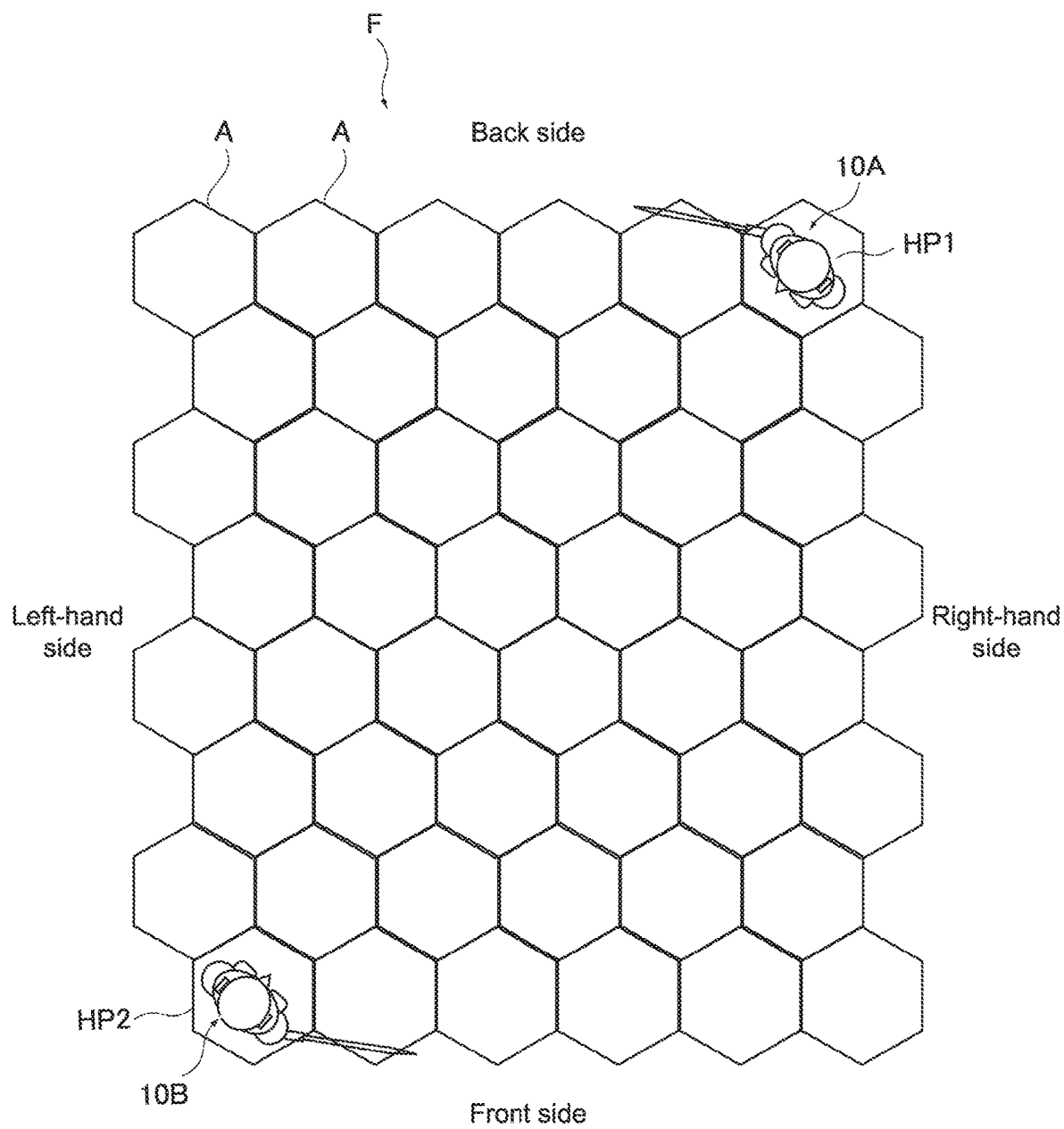
FIG. 23 A diagram showing a home position of the game battle robot shown in FIG. 20 on a field.

As shown in FIG. 23, the game battle robots 10A and 10B are arranged in the areas A at respective home positions HP1 and HP2 set on the field F. It is desirable for the home positions HP1 and HP2 in the field F to be positions set apart from each other. In the example shown in FIG. 23, the respective areas A at diagonal positions within the rectangular field F are set as the home positions HP1 and HP2. The shape of the area A is a regular hexagon in this example. In this case, the game battle robots 10A and 10B are rotated in increments of 60 degrees so as to be capable of moving from a certain area A to all of the surrounding areas A with one operation.

After the game battle robots 10A and 10B are arranged at the respective home positions HP1 and HP2, the non-contact power feed system 1 is activated, and the game battle robots 10A and 10B simultaneously start non-contact communication with the power feed apparatuses 20 in the areas A respectively corresponding to the home positions HP1 and HP2 to thus be authenticated.

Figure 24:
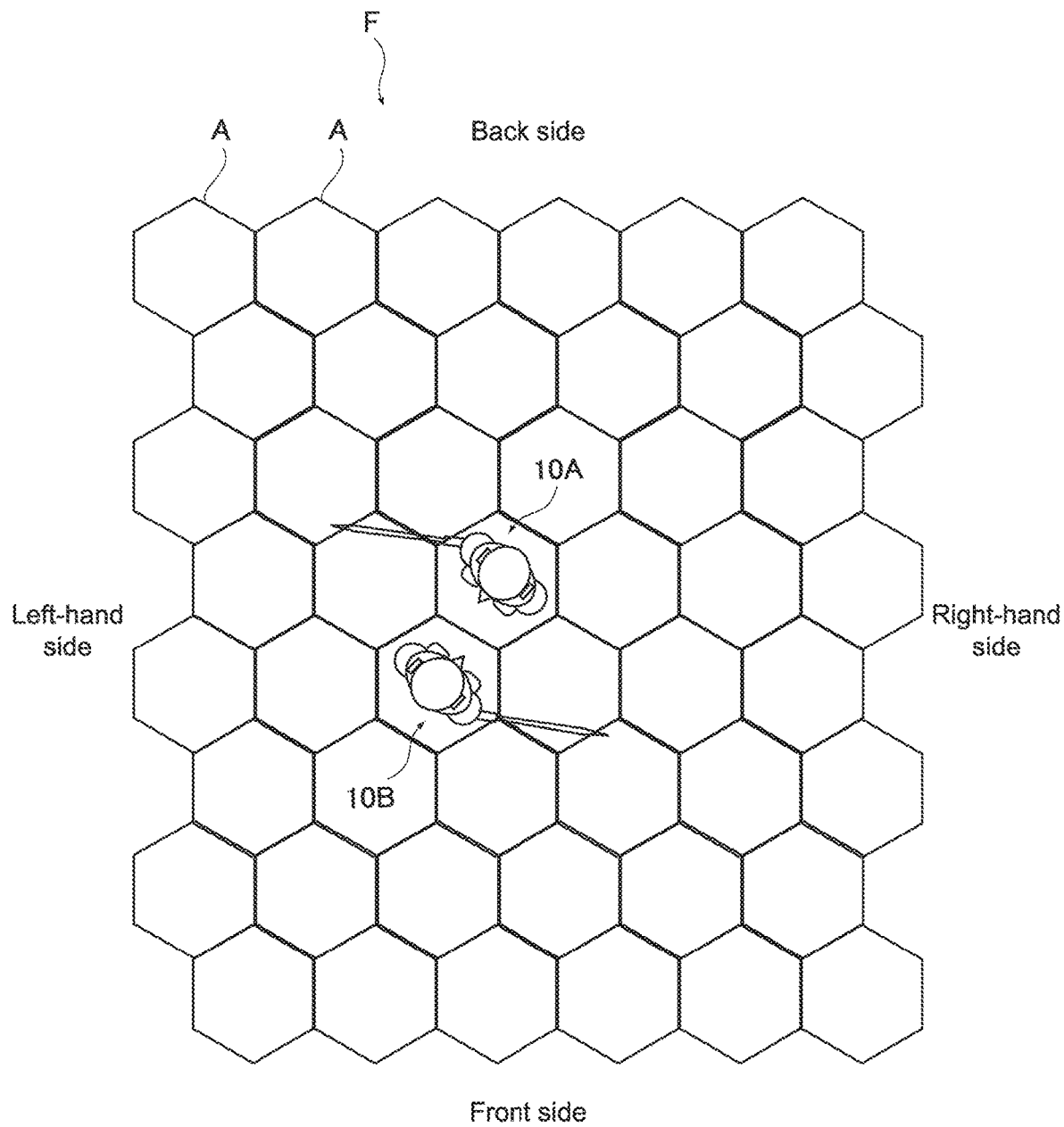
FIG. 24 A diagram showing an attackable positional relationship of the game battle robot shown in FIG. 20.

An operation instruction is given to each of the game battle robots 10A and 10B on the basis of a command from a user controller wirelessly connected thereto. The users of the respective game battle robots 10A and 10B operate the controllers to respectively move the game battle robots 10A and 10B from the home positions HP1 and HP2 one operation at a time, that is, one area at a time, and cause the game battle robots 10A and 10B to attack the counterpart when reaching an attackable distance as shown in FIG. 24, for example.

Figure 25:
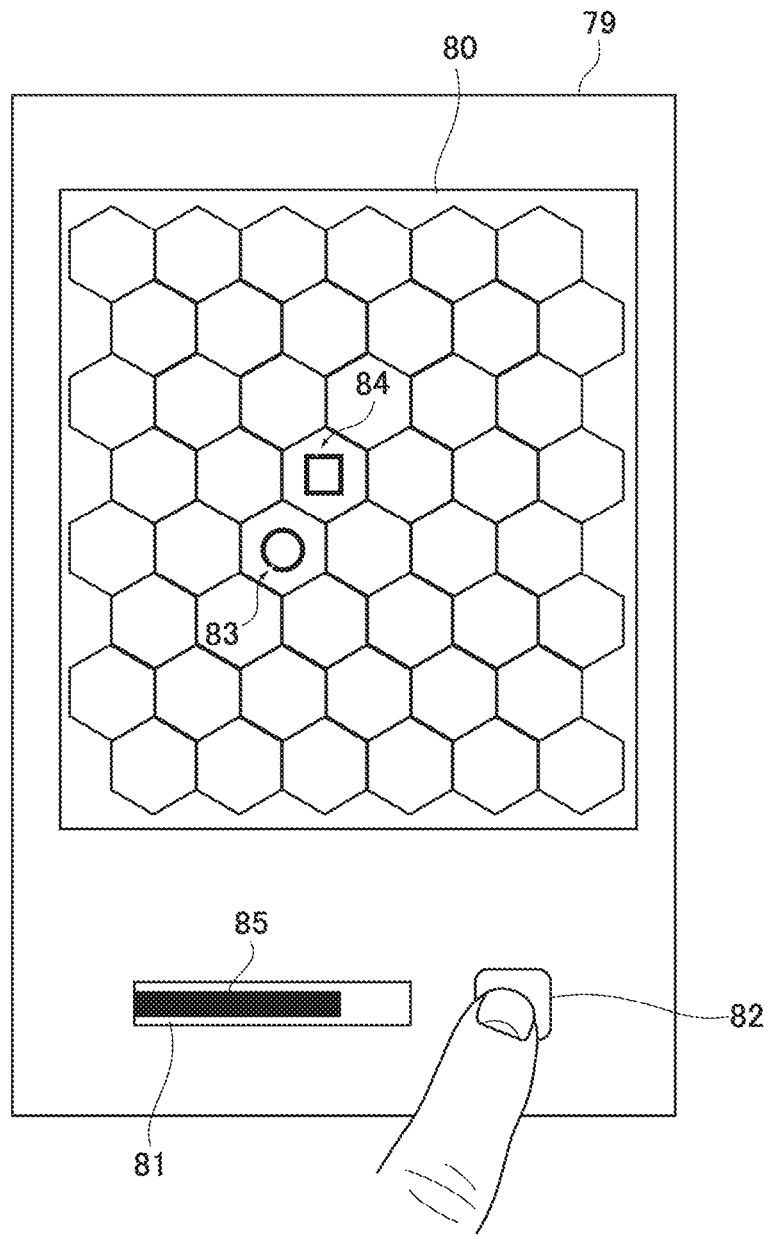
FIG. 25 A diagram showing a game operation screen of a controller for operating the game battle robot shown in FIG. 20.

FIG. 25 is a diagram showing a game operation screen of the controller for operating the game battle robot 10A.

In this game operation screen 79, a field map 80, a charge gauge 81, a charge button 82, and the like are arranged. The field map 80 is obtained by imaging the configuration of the field F, and the user can grasp the positions of the game battle robot 10A that he/she is operating and the counterpart game battle robot 10B in the field map 80. In this example, the game battle robot 10A that the user is operating is indicated by a round mark 83, and the counterpart game battle robot 10B is indicated by a square mark 84.

The controllers of the respective users are wirelessly and communicably connected to each other. For both of the controllers, an operation command given to the operation-target game battle robot 10A (or 10B) using the controller is transmitted to the counterpart controller via the wireless communication described above. Accordingly, the controller can arrange the square mark 84 in the area A where the counterpart game battle robot 10B (or 10A) exists on the field map 80 of the game operation screen 79.

The charge gauge 81 is used for presenting to the user in real time a charge state of the capacitance device 141 of the game battle robot 10A using a length-variable bar 85. In this charge gauge 81, the bar 85 extends rightwardly along with an increase in the charges or electric power amount stored in the capacitance device 141, and when a right end of the bar 85 reaches a right end of a frame of the charge gauge 81, it means that energy requisite for the game battle robot 10A to execute an operation is stored in the capacitance device 141.

The charge button 82 is a button for instructing the game battle robot 10A to charge the capacitance device 141. Specifically, while the charge button 82 is pressed, a charge instruction is given to the control unit 72 (see FIG. 30) of the game battle robot 10A from the controller.

Figure 30:
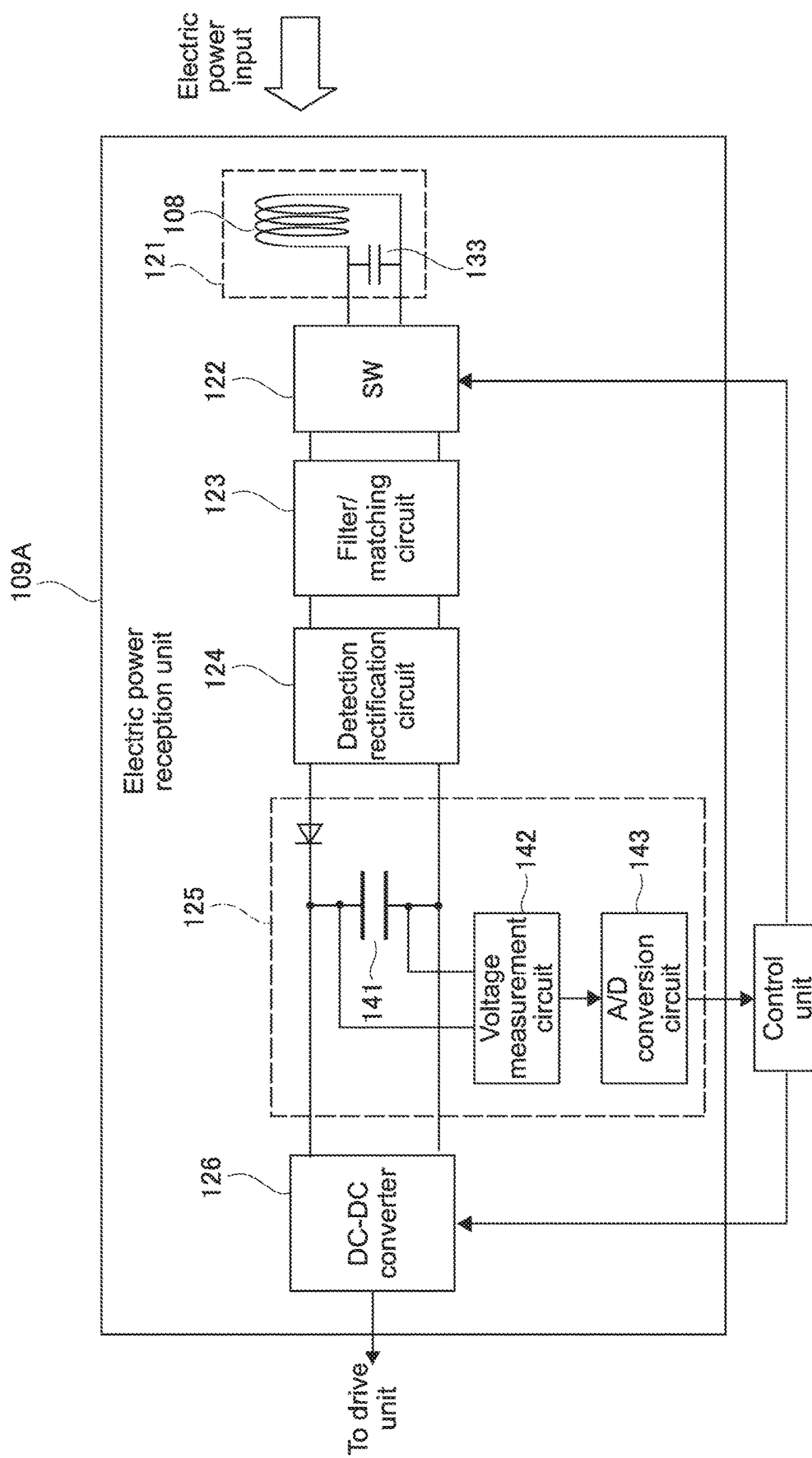
FIG. 30 A block diagram showing a configuration of an electric power reception unit of the game battle robot shown in FIG. 20.

FIG. 30 is a block diagram showing a configuration of an electric power reception unit 109A of the game battle robot 10A.

This electric power reception unit 109A is different from the electric power reception unit 109 according to the first embodiment (FIG. 5) in the point of including a switch (SW) 122 that switches on/off the connection between the electric power reception device unit 121 and the filter/matching circuit 123 on the basis of a control signal from the CPU 103.

The control unit 72 of the game battle robot 10A controls the switch (SW) 122 to turn on the connection between the electric power reception device unit 121 and the filter/matching circuit 123 while the charge instruction is given from the controller.

Accordingly, charges are accumulated in the capacitance device 141 of the game battle robot 10A using electric power transmitted from the power feed apparatus 20. This control is unique to the system according to the second embodiment.

In other words, in the second embodiment, for enhancing a game element, the electric power transmission from the power feed apparatus 20 to the game battle robot 10A is carried out only while the user operates the charge button 82 of the controller.

Figure 26:
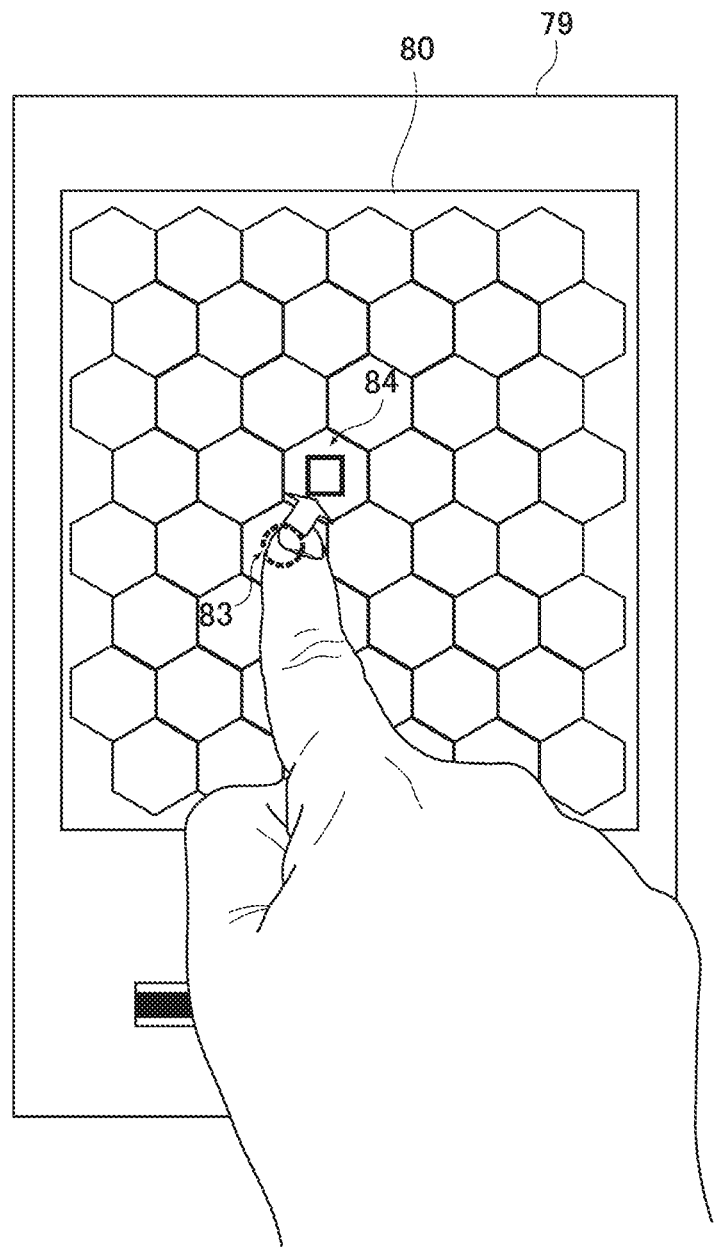
FIG. 26 A diagram showing an example of an operation of selecting a movement operation on a field map in the game operation screen shown in FIG. 25.
Figure 27:
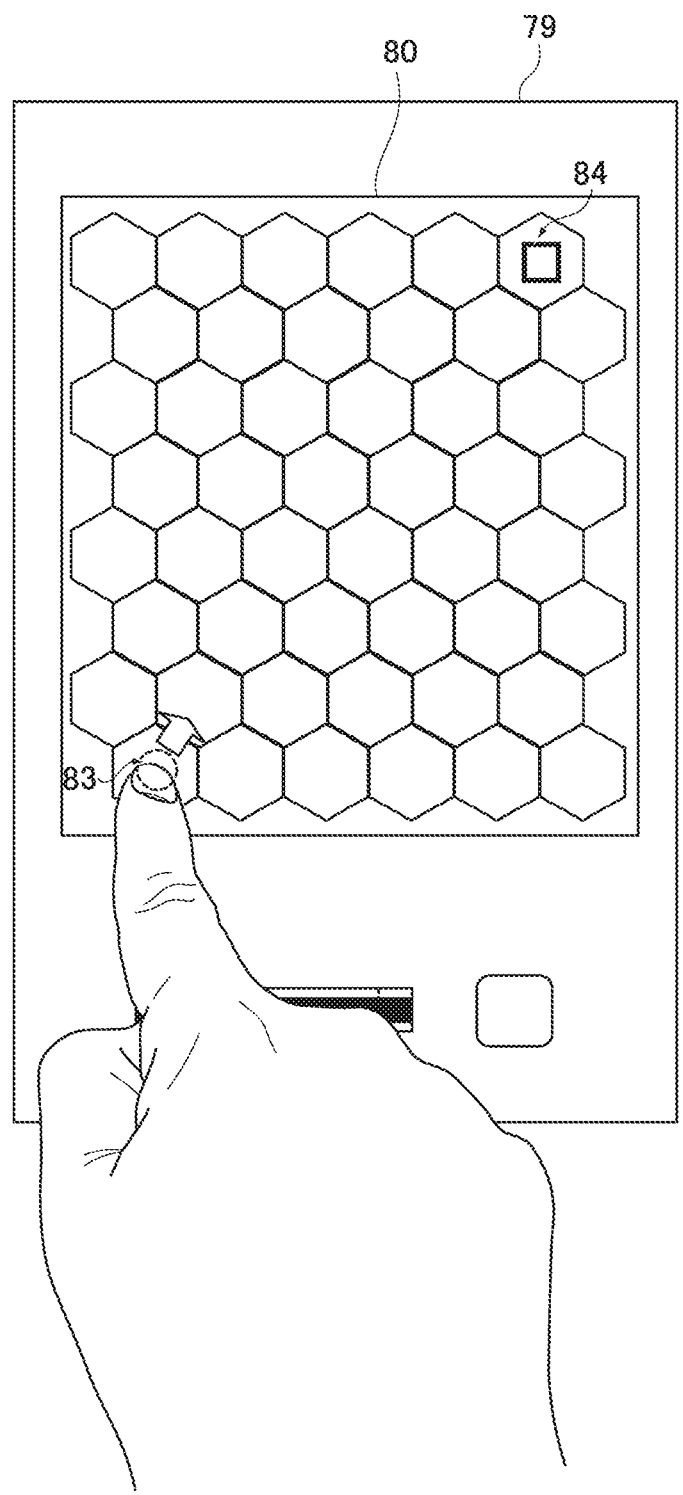
FIG. 27 A diagram showing another example of the operation of selecting a movement operation on the field map in the game operation screen shown in FIG. 25.

FIG. 26 is a diagram showing an example of an operation of selecting a movement operation on the field map 80. The user moves (swipes), on the field map 80, the game battle robot 10A from the currently-positioned area to the adjacent area as a movement destination while touching the screen with a finger or the like. The controller detects this operation and instructs the game battle robot 10A to execute the operation of moving the game battle robot 10A to the movement-destination area. At this time, the controller judges whether the counterpart game battle robot 10B is present in the movement-destination area and judges that, in a case where the counterpart game battle robot 10B is not present as shown in FIG. 27, an operation intended by the user is a movement. Further, in a case where the counterpart game battle robot 10B is present in the movement-destination area as shown in FIG. 27, the controller judges that the operation intended by the user is an attack with respect to the counterpart game battle robot 10B and instructs the game battle robot 10A to execute the attack operation.

It should be noted that such a judgment on the movement or attack may be carried out by the control unit 72 of the game battle robot 10A.

In a case of instructing a rotation operation, the game battle robot 10A is rotated only by a desired rotation angle using a finger while the fingertip is touching the area where the game battle robot 10A is present on the field map 80. In this example, the angle is approximated at 60-degree increments and judged.

Incidentally, the operation instruction input by the user on the field map 80 is given to the game battle robot 10A from the controller irrespective of whether the right end of the bar 85 in the charge gauge 81 has reached the right end of the frame of the charge gauge 81. The control unit 72 of the game battle robot 10A gives a control command to the drive unit so as to execute the operation in accordance with the instruction from the controller, and the drive unit attempts to execute the control command. At this time, the operation is executed if the charges or electric power amount accumulated in the capacitance device 141 are/is sufficient. However, in a case where the charges or electric power amount accumulated in the capacitance device 141 are/is insufficient, the operation is stopped in midst of the operation and resumed from that point in the middle next time the control unit 72 of the game battle robot 10A receives the same operation instruction from the controller.

It should be noted that as a modified example, if the right end of the bar 85 in the charge gauge 81 has not reached the right end of the frame of the charge gauge 81, control may be executed logically so as not to execute the operation in the game battle robot 10A.

Figure 28:
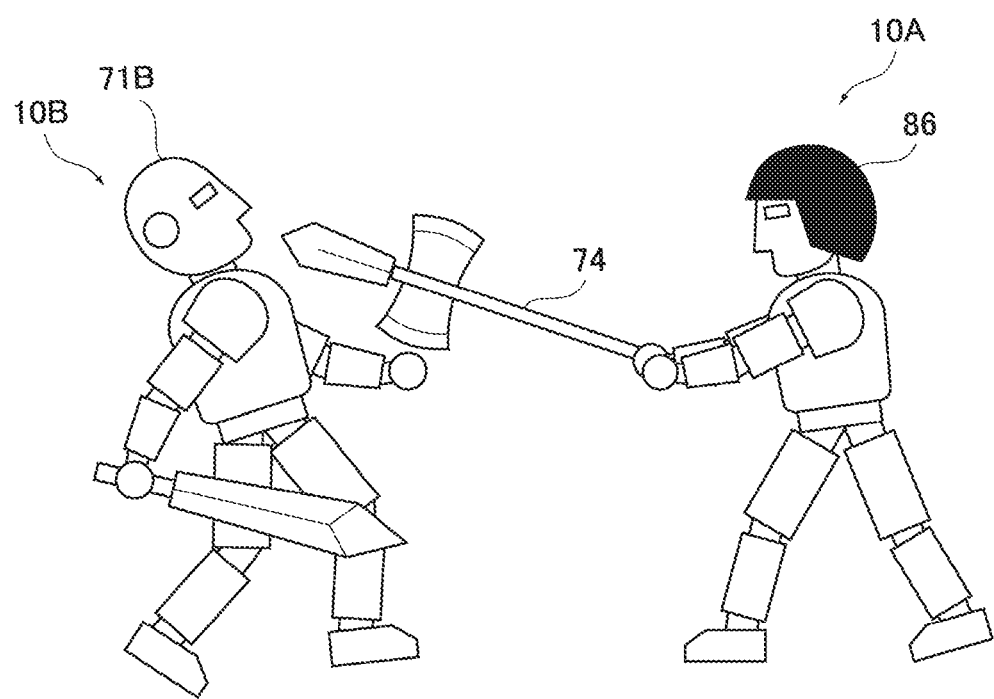
FIG. 28 A diagram for explaining level-up of a protective gear and weapon worn by the game battle robot shown in FIG. 20.

Furthermore, as shown in FIG. 28, the game battle robot 10A may be equipped with a protective gear 86 as an option, for example, on a head portion, arm portions, a body portion, and the like as the body portion 71 thereof. The protective gear 86 is used for protecting the body portion of the game battle robot 10A from being directly hit by the weapon of the counterpart.

Figure 29:
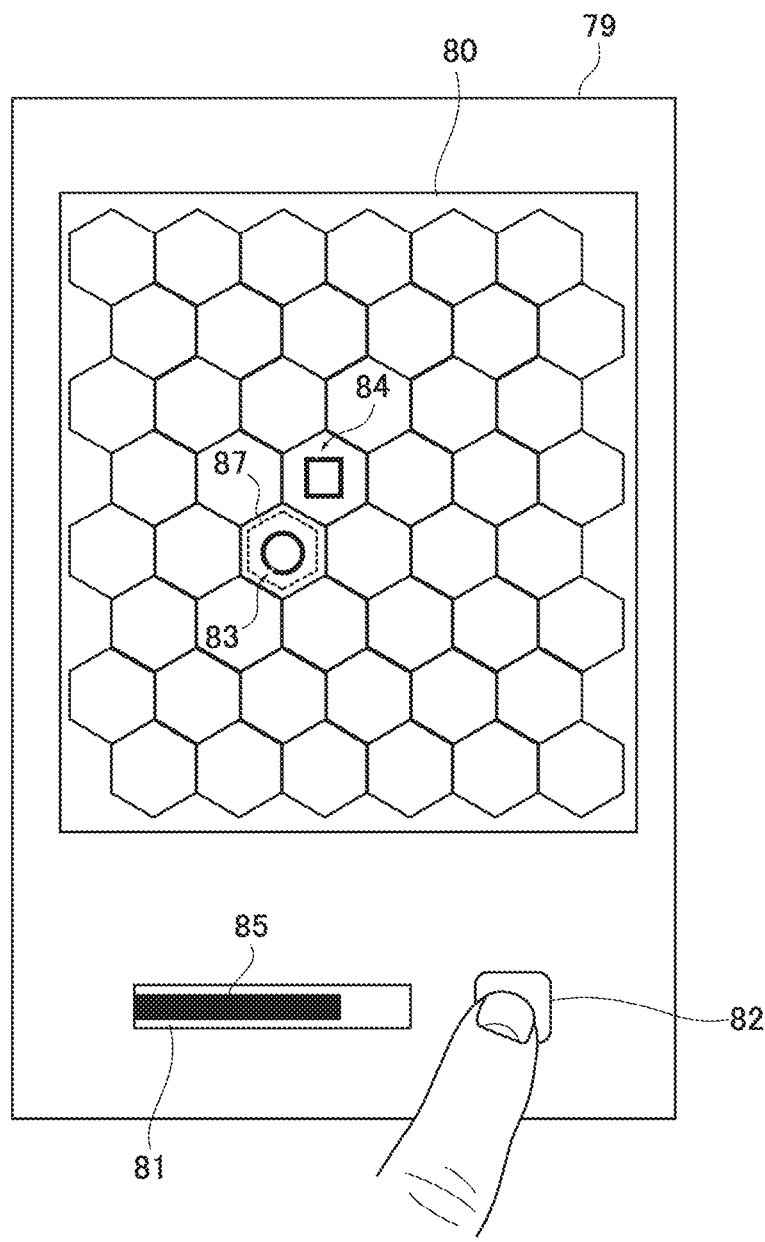
FIG. 29 A diagram showing a display example for protection on the field map in the game operation screen shown in FIG. 25.

Alternatively, it is also possible to enable the user to select defense as an operation. If defense is selected as an operation, an attack operation from the counterpart side with respect to the defense-target game battle robot 10A is invalidated. More specifically, if defense is selected as an operation, a protection barrier 87 is displayed so as to surround the area where that game battle robot 10A is present on the field map 80 of the controllers of the respective users as shown in FIG. 29. Even if an attack operation with respect to the game battle robot 10A in the area surrounded by the protection barrier 87 is designated by the user using the controller of the counterpart game battle robot 10B, the controller that has received that designation executes control so as to invalidate the attack operation due to the presence of the protection barrier 87.

As the weapon 73 that the game battle robot 10A is equipped with, weapons of different levels can be acquired and equipped by an option. For example, as shown in FIG. 28, a long weapon 74 can be acquired so that the game battle robot 10A can be equipped with it. A longer weapon is advantageous in that as the weapon becomes longer, the body portion of the counterpart game battle robot 10B can be hit from farther away. Alternatively, in accordance with the level-up of the equipped weapon, the control unit 72 of the game battle robot 10A may change an electric power transmission condition (power feed multiplication factor) and the like of the game battle robot 10A equipped with that weapon and perform control so that the charging of the capacitance device 141 is completed in a shorter time.

An effective time or effective condition may be set for the protection barrier 87. For example, invalidation of an attack operation from the counterpart side by the protection barrier 87 may be canceled after an elapse of a certain time. Alternatively, an upper limit may be set for the number of times the attack operation from the counterpart side is to be invalidated.

Figure 31:
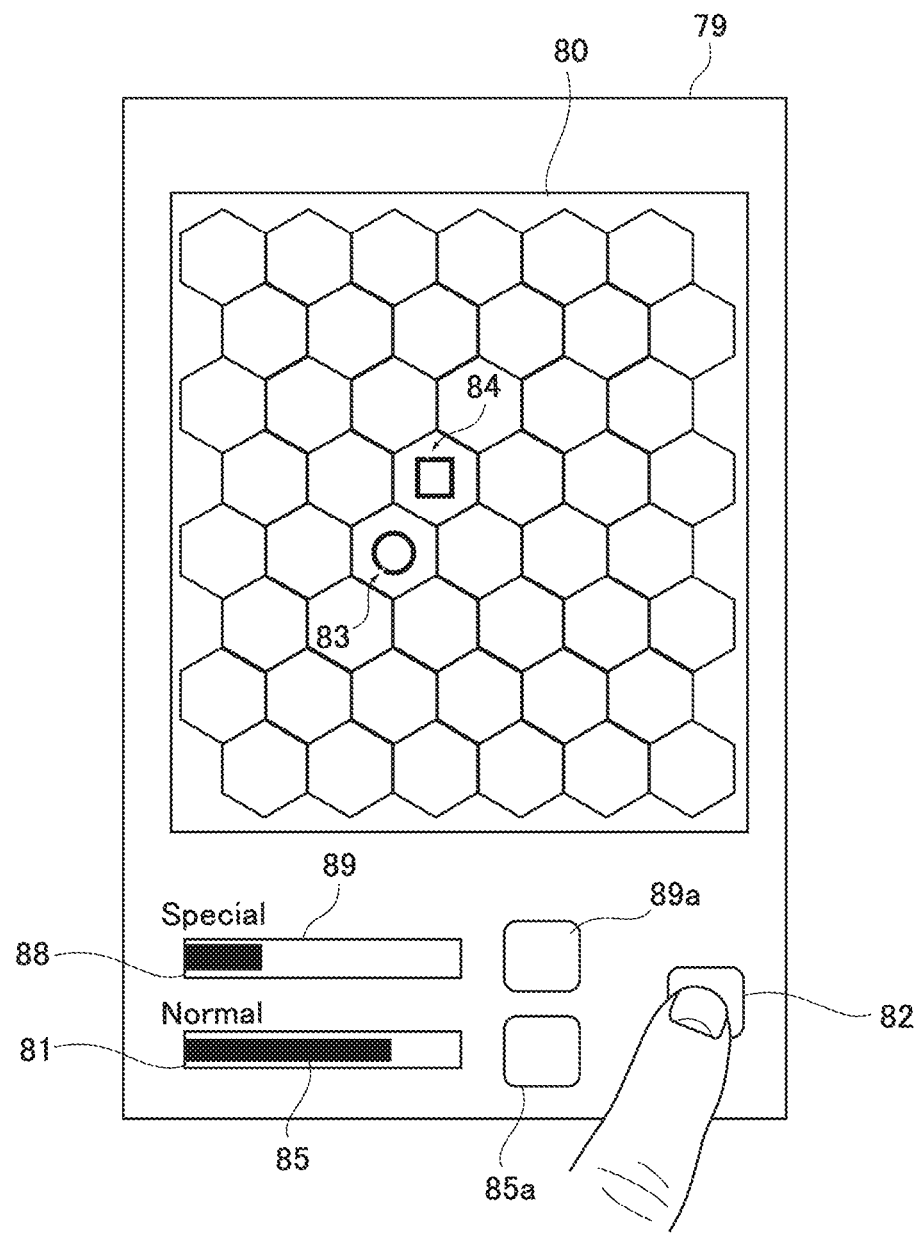
FIG. 31 A diagram showing an example of the game operation screen that can cause the game battle robot shown in FIG. 20 to invoke a special operation.

Further, as shown in FIG. 31, a special operation gauge 88 may be provided in addition to the charge gauge 81 that explicitly presents the charge state (charge ratio) of the capacitance device 141, in the game operation screen 79 of the controller of the game battle robot 10A. In this special operation gauge 88, a bar 89 extends at a pace different from that of the charge gauge 81. In this special operation gauge 88, if the charge button 82 is operated even when the charge gauge 81 is indicating a full-charge state, the bar 89 extends rightwardly in correspondence with the number of times the charge button 82 is operated. Specifically, the special operation gauge 88 is configured such that the length of the bar 89 varies in accordance with the number of times the charge button 82 is operated irrespective of the charge state of the capacitance device 141. At a time a tip end of the bar 89 reaches the right end of the special operation gauge 88, the controller permits activation of a special operation of the game battle robot 10A.

In a state where this activation of a special operation of the game battle robot 10A is permitted, a special operation activation button 89a provided on the right-hand side of the special operation gauge 88 is lit, for example. When this activation button 89a is operated by the user, the controller gives a special operation activation instruction to the game battle robot 10A. As the special operation of the game battle robot 10A, there is a special attack of the game battle robot 10A that is executed by driving the game battle robot 10A using the drive unit, or the like. More specifically, the special attack is an attack operation that requires a larger workload than a normal attack, or the like.

Further, instead of actually driving the game battle robot 10A, the special operation may be achieved only by logical control, such as invalidating a defense function or lowering defense performance of the protection barrier 87 that the counterpart has set.

It should be noted that in a case where the special operation gauge 88 and the special operation activation button 89a are provided in the game operation screen 79 of the controller, a button 85a for receiving a user instruction to cause the game battle robot 10A to start execution of an operation excluding the special operation when the tip end of the bar 85 reaches the right end of the gauge frame in the charge gauge 81 is provided. In a case where the user wishes to execute the special operation, the user continues pushing the charge button 82 without pressing the button 85a even when the tip end of the bar 85 reaches the right end of the gauge frame in the charge gauge 81. Accordingly, the bar 89 extends as it is in the special operation gauge 88. When the tip end of the bar 89 reaches the right end of the special operation gauge 88, activation of a special operation is permitted, and the special operation activation button 89a is lit. The special operation is activated by operating this special operation activation button 89a.

It should be noted that the present technology may also take the following configurations.

(1) A mobile object apparatus, including:

an electric power reception unit that receives electric power transmitted in a non-contact manner from, out of a plurality of power feed apparatuses that are allocated to a plurality of small areas within a predetermined area and are capable of transmitting electric power in a non-contact manner, the power feed apparatus allocated to the small area adjacent to the mobile object apparatus;

a drive unit that executes a movement operation on the predetermined area; and an electric power storage unit that stores an electric power amount requisite for the movement operation to the small areas within a predetermined range from the adjacent small area.

(2) The mobile object apparatus according to (1), in which the electric power storage unit is configured to store an electric power amount with which the operation can be executed once at most.

(3) The mobile object apparatus according to (1) or (2), further including a first control unit that calculates an electric power amount stored in the electric power storage unit at the time electric power is received and performs, when the calculated electric power amount reaches a threshold value requisite for the drive unit to execute the operation, control such that electric power stored in the electric power storage unit is supplied to the drive unit.

(4) The mobile object apparatus according to any one of (1) to (3), in which the first control unit is configured to transmit a temporal condition for permitting an electric power transmission from the power feed apparatus, to the power feed apparatus using non-contact communication.

(5) The mobile object apparatus according to any one of (1) to (4), in which the first control unit is configured to transmit a spatial condition for permitting an electric power transmission from the power feed apparatus, to the power feed apparatus using non-contact communication.

(6) The mobile object apparatus according to any one of (1) to (5), in which the first control unit is configured to transmit a power feed multiplication factor from the power feed apparatus, to the power feed apparatus using non-contact communication.

(7) A non-contact power feed system, including:

a plurality of power feed apparatuses that are allocated to a plurality of small areas within a predetermined area and are capable of transmitting electric power in a non-contact manner; and a mobile object apparatus that receives power feed from the power feed apparatus allocated to the small area adjacent to the mobile object apparatus and executes a movement operation on the predetermined area, the mobile object apparatus including an electric power reception unit that receives electric power transmitted from the power feed apparatus in a non-contact manner, a drive unit that executes the movement operation on the predetermined area, and an electric power storage unit that stores an electric power amount requisite for the movement operation to the small areas within a predetermined range from the adjacent small area.

(8) The non-contact power feed system according to (7), in which the drive unit of the mobile object apparatus is configured to be capable of executing a plurality of types of operations including the movement operation, and the power feed apparatuses each include a second control unit that transmits, in accordance with the small area allocated to the power feed apparatus itself, information for restricting the types of operations that can be executed by the mobile object apparatus, to the mobile object apparatus using non-contact communication.

(9) The non-contact power feed system according to (7) or (8), in which the predetermined area is configured to be sectioned into a plurality of medium areas each including one or more small areas and transmit, for each of the medium areas, different electric power from the power feed apparatuses belonging to the corresponding medium area.

(10) The non-contact power feed system according to any one of (7) to (9), further including a main controller that judges the one or more small areas to which the mobile object apparatus may move next on the basis of information of the small area where the mobile object apparatus is positioned, and performs control to set the one or more power feed apparatuses allocated to the one or more small areas to a power-saving transmission state.

REFERENCE SIGNS LIST

F field
S segment
A area
1 non-contact power feed system
10 mobile object apparatus
20 power feed apparatus
60 main controller
101 drive unit
103 CPU
108 electric power reception coil
109 electric power reception unit
121 electric power reception device unit
125 capacitance circuit
126 DC-DC converter
141 capacitance device
142 voltage measurement circuit
203 CPU
208 electric power transmission coil
209 electric power transmission unit
221 electric power transmission device unit

The invention claimed is:
1. A mobile object apparatus, comprising: an electric power reception circuit configured to receive electric power in a noncontact manner from a power feed apparatus of a plurality of power feed apparatuses, wherein the plurality of power feed apparatuses is allocated to a plurality of subareas within a specific area, a position of the mobile object apparatus is at a first sub-area of the plurality of sub-areas, and the power feed apparatus is allocated to the first sub-area; a servomotor configured to execute a movement operation to move the mobile object apparatus from the first sub-area to a second sub-area of a set of sub-areas of the plurality of sub-areas, wherein the set of sub-areas is closer to the first sub-area than remaining sub-areas of the plurality of sub-areas; an electric power storage circuit configured to store an electric power amount requisite for the servomotor to execute the movement operation, wherein the movement operation is executed once at most based on the stored electric power amount; a direct current-direct current (DC-DC) converter connected to the servomotor and the electric power storage circuit; and a control circuit configured to turn off the DC-DC converter, based on the stored electric power amount becoming less than a threshold value and completion of the execution of the movement operation.

2. The mobile object apparatus according to claim 1, wherein the control circuit is further configured to:
calculate the electric power amount stored in the electric power storage circuit; and
control, based on the calculated electric power amount that is equal to the threshold value, the electric power storage circuit to supply the stored electric power amount to the servomotor via the DC-DC converter.

3. The mobile object apparatus according to claim 2, wherein
the control circuit is further configured to transmit, to the power feed apparatus using non-contact communication, a temporal condition to permit an electric power transmission from the power feed apparatus.

4. The mobile object apparatus according to claim 2, wherein
the control circuit is further configured to transmit, to the power feed apparatus using non-contact communication, a spatial condition to permit an electric power transmission from the power feed apparatus.

5. The mobile object apparatus according to claim 2, wherein
the control circuit is further configured to transmit a power feed multiplication factor to the power feed apparatus using non-contact communication.

6. A non-contact power feed system, comprising: a plurality of power feed apparatuses allocated to a plurality of sub-areas within a specific area; and a mobile object apparatus that includes: an electric power reception circuit configured to receive electric power in a non-contact manner from a power feed apparatus of the plurality of power feed apparatuses, wherein a position of the mobile object apparatus is at a first sub-area of the plurality of sub-areas, and the power feed apparatus is allocated to the first sub-area; a servomotor configured to execute a movement operation to move the mobile object apparatus from the first sub-area to a second sub-area of a set of sub-areas of the plurality of sub-areas, wherein the set of sub-areas is closer to the first sub-area than remaining sub-areas of the plurality of sub-areas; an electric power storage circuit configured to store an electric power amount requisite for the servomotor to execute the movement operation, wherein the movement operation is executed once at most based on the stored electric power amount; a direct current-direct current (DC-DC) converter connected to the servomotor and the electric power storage circuit; and a control circuit configured to turn off the DC-DC converter, based on the stored electric power amount becoming less than a threshold value and completion of the execution of the movement operation.

7. The non-contact power feed system according to claim 6, wherein
the servomotor is further configured to execute a plurality of types of operations including the movement operation, and
each of the plurality of power feed apparatuses includes a control unit configured to transmit, to the mobile object apparatus using non-contact communication, information to restrict the execution of the plurality of types of operations.

8. The non-contact power feed system according to claim 7, wherein
the specific area further includes a plurality of segments,
each of the plurality of segments includes at least one sub-area of the plurality of sub-areas,
a first segment of the plurality of segments is associated with a first set of power feed apparatuses of the plurality of power feed apparatuses,
a second segment of the plurality of segments is associated with a second set of power feed apparatuses of the plurality of power feed apparatuses,
the first set of power feed apparatuses is configured to transmit first electric power,
the second set of power feed apparatuses is configured to transmit second electric power, and
the first electric power is different from the second electric power.

9. The non-contact power feed system according to claim 8, further comprising a main controller configured to:
determine, based on specific information of the first sub-area, the set of sub-areas to which the mobile object apparatus may move next; and
control a third set of power feed apparatuses of the plurality of power feed apparatuses to operate in a power-saving transmission state,
wherein the third set of power feed apparatuses is allocated to the set of sub-areas.

10. A method of driving a mobile object apparatus, comprising: receiving, by an electric power reception circuit, electric power in a non-contact manner from a power feed apparatus of a plurality of power feed apparatuses, wherein the plurality of power feed apparatuses is allocated to a plurality of subareas within a specific area, a position of the mobile object apparatus is at a first sub-area of the plurality of sub-areas, and the power feed apparatus is allocated to the first sub-area; executing, by a servomotor, a movement operation to move the mobile object apparatus from the first sub-area to a second sub-area of a set of sub-areas of the plurality of sub-areas, wherein the set of sub-areas is closer to the first sub-area than remaining sub-areas of the plurality of sub-areas; storing, by an electric power storage circuit, an electric power amount requisite for the servomotor to execute the movement operation, wherein the movement operation is executed once at most based on the stored electric power amount; and turning off, by a control circuit, a direct current-direct current (DC-DC) converter, based on the stored electric power amount becoming less than a threshold value and completion of the execution of the movement operation, wherein the DC-DC converter is connected to the servomotor and the electric power storage circuit.

\* \* \* \* \*